United States Patent
Paasonen et al.

(10) Patent No.: US 9,785,329 B2
(45) Date of Patent: Oct. 10, 2017

(54) POCKET COMPUTER AND ASSOCIATED METHODS

(75) Inventors: Juho Paasonen, Espoo (FI); Henri Melaanvuo, Karjaa (FI); Roope Rainisto, Helsinki (FI); Petri Tolppanen, Kauniainen (FI); Hannu Pirskanen, Oulu (FI); Kalle Saarinen, Tampere (FI); Matti Vaisanen, Helsinki (FI); Virpi Roto, Espoo (FI); Panu Johansson, Tampere (FI); Eero Tamminen, Vantaa (FI); Simo Säde, Helsinki (FI); Jussi-Pekka Kekki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 938 days.

(21) Appl. No.: 11/135,624

(22) Filed: May 23, 2005

(65) Prior Publication Data
US 2006/0265653 A1  Nov. 23, 2006

(51) Int. Cl.
*G06F 3/14* (2006.01)
*G06F 3/0485* (2013.01)
*G06F 9/00* (2006.01)
*G06F 17/30* (2006.01)
*G06F 3/0362* (2013.01)

(52) U.S. Cl.
CPC .............. *G06F 3/0485* (2013.01); *G06F 9/00* (2013.01); *G06F 17/30905* (2013.01)

(58) Field of Classification Search
USPC .................. 715/716, 843, 864, 838; 725/37; 710/30; 348/552
See application file for complete search history.

(56) References Cited

U.S. PATENT DOCUMENTS

| | | | |
|---|---|---|---|
| 4,969,097 A | * | 11/1990 | Levin ............................ 715/234 |
| 5,375,201 A | | 12/1994 | Davoust |
| 5,523,775 A | | 6/1996 | Capps |
| 5,543,591 A | | 8/1996 | Gillespie et al. |
| 5,623,681 A | | 4/1997 | Rivette et al. |
| 5,675,753 A | | 10/1997 | Hansen et al. |
| 5,689,666 A | | 11/1997 | Berquist et al. |
| 5,703,620 A | | 12/1997 | Keyson |
| 5,724,457 A | * | 3/1998 | Fukushima ................... 382/311 |

(Continued)

FOREIGN PATENT DOCUMENTS

| | | |
|---|---|---|
| EP | 0 632 637 A1 | 1/1995 |
| EP | 0 671 682 A2 | 3/1995 |

(Continued)

OTHER PUBLICATIONS

"Glimpse: A Novel Input Model for Multi-Level Devices", Clifton Forlines, et al., Mitsubishi Electric Research Laboratories, Dec. 2005, pp. 1-5.

(Continued)

*Primary Examiner* — Nicholas Augustine
(74) *Attorney, Agent, or Firm* — Alston & Bird LLP

(57) ABSTRACT

A pocket computer is presented having an apparatus housing and a user interface with a touch-sensitive display provided at a first side surface of said apparatus housing, at least one key for navigation among content shown on said display, and at least one key for performing zooming on content shown on said display. Various methods of operating this user interface are also presented.

13 Claims, 22 Drawing Sheets

(56) References Cited

U.S. PATENT DOCUMENTS

| | | | |
|---|---|---|---|
| 5,801,771 A | | 9/1998 | Ohwaki et al. |
| 5,805,159 A | * | 9/1998 | Bertram et al. ............ 715/764 |
| 5,864,340 A | * | 1/1999 | Bertram et al. ............ 715/780 |
| 5,953,541 A | | 9/1999 | King et al. ............ 395/887 |
| 5,959,629 A | * | 9/1999 | Masui ............ 715/808 |
| 5,995,084 A | | 11/1999 | Chan et al. |
| 5,999,176 A | | 12/1999 | Kamper |
| 6,002,390 A | * | 12/1999 | Masui ............ 345/173 |
| 6,008,817 A | | 12/1999 | Gilmore, Jr. |
| 6,173,297 B1 | | 1/2001 | Moon et al. |
| 6,208,345 B1 | | 3/2001 | Sheard et al. |
| 6,278,465 B1 | | 8/2001 | Nielsen |
| 6,321,158 B1 | * | 11/2001 | DeLorme et al. ............ 701/201 |
| 6,337,698 B1 | * | 1/2002 | Keely et al. ............ 715/823 |
| 6,570,583 B1 | | 5/2003 | Kung et al. |
| 6,640,185 B2 | | 10/2003 | Yokota et al. |
| 6,862,712 B1 | | 3/2005 | Nakagawa et al. |
| 7,006,074 B2 | | 2/2006 | Chesters |
| 7,009,599 B2 | | 3/2006 | Pihlaja |
| 7,107,204 B1 | | 9/2006 | Liu et al. |
| 7,171,353 B2 | * | 1/2007 | Trower et al. ............ 704/9 |
| 7,194,404 B1 | * | 3/2007 | Babst et al. ............ 704/9 |
| 7,225,407 B2 | | 5/2007 | Sommerer et al. |
| 7,228,268 B2 | | 6/2007 | Xun |
| 7,254,527 B2 | | 8/2007 | Xun |
| 7,315,809 B2 | | 1/2008 | Xun |
| 7,327,349 B2 | | 2/2008 | Robbins et al. |
| 8,015,259 B2 | | 9/2011 | Swahn |
| 2001/0045949 A1 | | 11/2001 | Chithambaram et al. |
| 2002/0015042 A1 | * | 2/2002 | Robotham et al. ............ 345/581 |
| 2002/0024506 A1 | * | 2/2002 | Flack et al. ............ 345/169 |
| 2002/0052900 A1 | * | 5/2002 | Freeman ............ 707/531 |
| 2002/0103698 A1 | | 8/2002 | Cantrell |
| 2002/0130904 A1 | | 9/2002 | Becker et al. |
| 2002/0156864 A1 | * | 10/2002 | Kniest ............ 709/217 |
| 2002/0186257 A1 | * | 12/2002 | Cadiz et al. ............ 345/838 |
| 2003/0043114 A1 | | 3/2003 | Silfverberg et al. |
| 2003/0045331 A1 | | 3/2003 | Montebovi |
| 2003/0095095 A1 | | 5/2003 | Pihlaja |
| 2003/0098891 A1 | | 5/2003 | Molander |
| 2003/0193524 A1 | * | 10/2003 | Bates et al. ............ 345/786 |
| 2004/0046732 A1 | | 3/2004 | Chesters |
| 2004/0061716 A1 | * | 4/2004 | Cheung et al. ............ 345/710 |
| 2004/0178997 A1 | | 9/2004 | Gillespie et al. |
| 2004/0239681 A1 | * | 12/2004 | Robotham et al. ............ 345/581 |
| 2005/0012723 A1 | * | 1/2005 | Pallakoff ............ 345/173 |
| 2005/0044506 A1 | | 2/2005 | Makela |
| 2005/0052427 A1 | | 3/2005 | Wu et al. |
| 2005/0195221 A1 | * | 9/2005 | Berger et al. ............ 345/660 |
| 2005/0223308 A1 | * | 10/2005 | Gunn et al. ............ 715/500 |
| 2005/0283364 A1 | * | 12/2005 | Longe et al. ............ 704/257 |
| 2006/0020904 A1 | * | 1/2006 | Aaltonen et al. ............ 715/850 |
| 2006/0026521 A1 | * | 2/2006 | Hotelling et al. ............ 715/702 |
| 2006/0026535 A1 | * | 2/2006 | Hotelling et al. ............ 715/863 |
| 2006/0026536 A1 | * | 2/2006 | Hotelling et al. ............ 715/863 |
| 2006/0095842 A1 | * | 5/2006 | Lehto ............ 715/532 |
| 2006/0097993 A1 | | 5/2006 | Hietala et al. |
| 2006/0101005 A1 | * | 5/2006 | Yang et al. ............ 707/3 |
| 2006/0112346 A1 | | 5/2006 | Miksovsky et al. |
| 2006/0161870 A1 | * | 7/2006 | Hotelling et al. ............ 715/863 |
| 2006/0161871 A1 | * | 7/2006 | Hotelling et al. ............ 715/863 |
| 2006/0267967 A1 | | 11/2006 | Hinckley et al. |
| 2006/0274051 A1 | * | 12/2006 | Longe et al. ............ 345/173 |
| 2007/0263007 A1 | * | 11/2007 | Robotham et al. ............ 345/581 |

FOREIGN PATENT DOCUMENTS

| | | |
|---|---|---|
| EP | 1 517 228 A | 3/2005 |
| EP | 1 574 971 A1 | 9/2005 |
| JP | 10-340178 | 12/1998 |
| JP | 2000163444 | 6/2000 |
| JP | 2002-323850 A | 11/2002 |
| JP | 2003-282922 | 10/2003 |
| JP | 2004-206300 A | 7/2004 |
| JP | 2004-265142 | 9/2004 |
| KR | 2019980009337 | 4/1998 |
| KR | 2005-0027892 A | 3/2005 |
| WO | 02/08881 | 1/2002 |
| WO | WO 02/08881 A1 | 1/2002 |

OTHER PUBLICATIONS

"Roll Up Window with Your Middle Mouse Button and Wheel Button Click", www.shelltoys.com/mouse_software/rollup_window.html, Jun. 15, 2005, p. 1.

"Matchbox X11", Open Source, http://freshmeat.net/projects/matchbox/, Jun. 15, 2005, pp. 1-2.

Acrobat Reader® 7.0, Adobe Systems Inc., Public product.

OS X, Apple Computer Inc., Public product.

Windows, Microsoft Corporation, Public product.

Series 90, Nokia, Public product.

7710 Communicator, Nokia, Public product.

Symbian OS, Symbian Ltd., Public product.

Palm OS, PalmSource Inc., Public product.

Photoshop, Adobe Systems Inc., Public product.

Imageready, Adobe System Inc., Public product.

Picsel web browser, Picsel Technologies Ltd., Public product.

Opera Browser, Opera Software AFA, Public product.

Windows mobile, Microsoft Corporation, Public product.

Embedded Linux, Embedded Linux Consortium, Public product.

Internet explorer, Microsoft Corporation, Public product.

Netscape browser, Netscape Communications Corp., Public product.

Firebird/Firefox, Mozilla, Public Product.

Pocket PC OS, Microsoft Corporation, Public Product.

Series 60, Nokia, Public Product.

Palm Inc., "Handbook for the Palm Zire 71 Handheld." 2003 <http://www.palm.com/us/support/handbooks/zire71/zire71_hb_ENG.pdf>.

Palm Inc., "using your Treo." 2007 <http://www.palm.com/us/support/handbooks/treo/treo600gsm_UG.pdf>.

Textware Solutions, "Fitaly Virtual Options and Advanced Features." Mar. 13, 2004 <http://webarchive.org/web/20040313051005/http://fitaly.com/fitalyvirtual3/fitalysetup.htm#mru>.

Apple Computer Inc. "Dashboard—Handy widgets at your command." May 7, 2005 <http://webarchive.org/web/2005050720223/http://www.apple.com/macosx/features/dashboard/>.

Nintendo. "Nintendo DS Technical Specs." Nov. 12, 2004 <http:web.archive.org/web/20041112133534/http://www.nintendo.com/techspecds>.

Amazon.com: Palm Zire 71 Handheld: Electronics. <http://www.amazon.com/PALM-P80720US-PalmOne-Zire-Handheld/dp/B00008WFVI> 2007.

Red Hat. "Red Hat Linux 6.1: The Official Red Hat Linux Getting Started Guide, Chapter 11. The Enlightenment Window Manager." Oct. 18, 2003. <http://web.archive.org/web/20031018155954/http://www.redhat.com/docs/manuals/linux/RHL-6.1-Manual/getting-started-guide/ecapplet.html>.

Apple Computer Inc. "Apple Unleashes "Tiger" Friday at 6:00 p.m." Apr. 28, 2005 <www. apple.com/pr/library/2005/apr/28tiger.html>.

International Search Report, PCT/IB2006/001330, mailed Jul. 9, 2007.

Korean Office Action dated Sep. 16, 2010.

Japanese Office Action dated Nov. 16, 2010.

Kazumi Takei, Manual on How to Make Thorough Use of Visor Deluxe, First Edition, Media Tech Publishing, Inc., Kazuo Sato, Oct. 18, 2000, vol. 1, pp. 30-33, 44, ISBN: 4-89627-090-8.

English Translation of Korean Office Action dated May 31, 2011.

freshmeat.net: Project details for Matchbox Window Manager [online] [retrieved Jan. 2, 2013]. Retrieved from the Internet: <URL: http://web.archive.org/web/20040504183514/http://freshmeat.net/projects/matchbox/>. 2 pages.

International Search Report and Written Opinion for Application No. PCT/IB2007/001304 dated Jun. 26, 2008.

Office Action for U.S. Appl. No. 11/249,156 dated May 24, 2012.

(56) References Cited

OTHER PUBLICATIONS

Office Action for U.S. Appl. No. 11/249,156 dated Jun. 21, 2011.
Office Action for Chinese Application No. 200780024811.3 dated Nov. 3, 2011.
Office Action for Japanese Application No. 2008-512937 dated Aug. 16, 2011.
Office Action for Russian Application No. 2007143132/09 dated Jan. 22, 2010.
Office Action for Singapore Application No. 201003586-3 dated Mar. 8, 2011.
Definition of "Orthogonal". Google Search [online]. Google, 2010 [retrieved on Jan. 16, 2010]. Retrieved from the Internet: <URL:http://www.google.com/search?hl=en &rls=GGLD,GGLD:2004-30,GGLD:en&ei=Du5RS7_ AGtK2IAeh4pWtCg&sa=X&oi=spell&resnum=0&ct=result &cd=1&ved=0CBQQBSgA&q=define%3A+orthogonal &spell=1>.
International Preliminary Report on Patentability (Chapter II) for Application No. PCT/IB2007/001304 dated Feb. 6, 2009.
International Preliminary Report on Patentability and Written Opinion for Application No. PCT/IB2006/001330 dated Nov. 23, 2007.
Office Action—Advisory Action for U.S. Appl. No. 11/249,156 dated Mar. 29, 2013.
Office Action—Advisory Action for U.S. Appl. No. 11/249,156 dated May 21, 2010.
Office Action—Advisory Action from U.S. Appl. No. 11/158,921 dated Apr. 2, 2010.
Office Action—Advisory Action from U.S. Appl. No. 11/158,921 dated Feb. 18, 2009.
Office Action—Advisory Action from U.S. Appl. No. 11/438,900 dated Jan. 6, 2010.
Office Action—Final Rejection for U.S. Appl. No. 11/249,156 dated Apr. 13, 2009.
Office Action—Final Rejection for U.S. Appl. No. 11/249,156 dated Dec. 8, 2010.
Office Action—Final Rejection for U.S. Appl. No. 11/249,156 dated Jan. 16, 2013.
Office Action—Final Rejection for U.S. Appl. No. 11/249,156 dated Jul. 2, 2014.
Office Action—Final Rejection for U.S. Appl. No. 11/249,156 dated Mar. 4, 2010.
Office Action—Final Rejection for U.S. Appl. No. 11/249,156 dated Oct. 28, 2008.
Office Action—Notice of Allowance from U.S. Appl. No. 11/249,156 dated Jun. 1, 2016.
Office Action—Notice of Allowance from U.S. Appl. No. 11/249,156 dated Nov. 9, 2015.
Office Action—Pre-Brief Appeal Conference Decision from U.S. Appl. No. 11/249,156 dated Oct. 25, 2013.
Office Action—Pre-Brief Appeal Conference Decision from U.S. Appl. No. 11/249,156 dated Oct. 30, 2014.
Office Action for U.S. Appl. No. 11/249,156 dated Dec. 19, 2013.
Office Action for U.S. Appl. No. 11/249,156 dated Feb. 21, 2008.
Office Action for U.S. Appl. No. 11/249,156 dated Jun. 17, 2013.
Office Action for U.S. Appl. No. 11/249,156 dated Jun. 22, 2010.
Office Action for U.S. Appl. No. 11/249,156 dated Sep. 2, 2009.
Office Action for U.S. Appl. No. 11/439,530 dated Jul. 21, 2009.
Office Action from corresponding European Patent Application No. 06755899.9 dated Mar. 18, 2009.
Office Action from corresponding European Patent Application No. 06755899.9 dated May 12, 2015.
Office Action from U.S. Appl. No. 11/158,921 dated Apr. 2, 2008.
Office Action from U.S. Appl. No. 11/158,921 dated Jan. 21, 2010.
Office Action from U.S. Appl. No. 11/158,921 dated May 12, 2009.
Office Action from U.S. Appl. No. 11/158,921 dated Sep. 30, 2010.
Office Action from U.S. Appl. No. 11/438,900 dated Apr. 28, 2009.
Office Action from U.S. Appl. No. 11/438,900 dated Oct. 28, 2009.
Office Action from U.S. Appl. No. 11/439,530 dated Jan. 5, 2010.
Office Action from U.S. Appl. No. 11/439,530 dated Jan. 6, 2011.
Office Action from U.S. Appl. No. 11/439,530 dated Jul. 20, 2010.
Sigmarion III instruction manual, Nippon Electric Company Limited, Apr. 2003, pp. 36-37.

\* cited by examiner

301

Pol. I hear him coming: let's withdraw, my lord.
[Exeunt King and Polonius.]
[Enter Hamlet.]
Ham. To be, or not to be,--that is the question:-- Whether 'tis nobler in the mind to suffer The slings and arrows of outrageous fortune Or to take arms against a sea of troubles, And by opposing end them?--To die,--to sleep,-- No more; and by a sleep to say we end The heartache, and the thousand natural shocks That flesh is heir to,--'tis a consummation Devoutly to be wish'd. To die,--to sleep;-- To sleep! perchance to dream:--ay, there's the rub; For in that sleep of death what dreams may 317  318

*Fig. 23*

POCKET COMPUTER AND ASSOCIATED METHODS

FIELD OF THE INVENTION

The present invention generally relates to portable electronic equipment, and more particularly to a pocket computer having a graphical user interface. The invention also relates to various methods of operating the user interface.

BACKGROUND OF THE INVENTION

Pocket computers with graphical user interfaces have become increasingly popular in recent years. Perhaps the most common example of a pocket computer is a personal digital assistant (PDA), which may be embodied in various different forms. Some pocket computers resemble laptop personal computers but in a miniaturized scale, i.e. they comprise a graphical display and a small hardware keyboard. The graphical display is typically touch-sensitive and may be operated by way of a pointing tool such as a stylus, pen or a user's finger. Other pocket computers rely more heavily on a touch-sensitive display as the main input device and have thus dispensed with a hardware keyboard. Some of these pocket computers are in fact mobile terminals, i.e. in addition to providing typical pocket computer services such as calendar, word processing and games, they may also be used in conjunction with a mobile telecommunications system for services like voice calls, fax transmissions, electronic messaging, Internet browsing, etc.

It is well known in the field that because of the noticeably limited resources of pocket computers, in terms of physical size, display size, data processing power and input device, compared to laptop or desktop computers, user interface solutions known from laptop or desktop computers are generally not applicable or relevant for pocket computers.

It is generally desired to provide improvements to the user interface of such pocket computers so as to enhance the user friendliness and improve the user's efficiency when using the pocket computer.

In computers in general, and in pocket computers in particular, there is a need to navigate through content which is larger than what can be displayed on the current display. This is especially apparent when using a web browser application on a pocket computer, as web pages are usually designed to be displayed on normal computer displays being considerably larger than the displays of pocket computers.

A traditional way to solve this problem is to provide horizontal and vertical scrollbars, allowing a user to move the displayed content among the available content either by using scroll buttons on the scrollbar, or by moving the scroll indicator which indicates where the displayed content is located in the available content. On computers with a full size keyboard, it is also possible to move a cursor through the content with dedicated direction keys such as up, down, left, right, page up and page down, also resulting in content displayed on the display being shifted, or scrolled.

A more intuitive way to navigate through large content is to use what is called panning, a method which for example is used in Adobe Acrobat Reader® 7.0. This works in a similar way to when a user moves a paper with his/her hand on a desk in front of him/her. The user simply 'drags' the content by depressing a mouse button and moving the mouse while the mouse button is still depressed, and releasing the mouse button when the content is in the desired position.

Another function which is useful in computers is selecting data, for example text. Once the text is selected, the user may for example copy this text to a buffer which may be pasted into the same or another document.

A manner known in the art to perform data selection is to 'drag' over the text to be selected by depressing a mouse button, moving the mouse while pressing the mouse button over the text to be selected, and releasing the mouse button once the desired text is selected.

An issue thus arises of how to be able to provide a way for the user to pan and select data in the same document, as the method of dragging is used in both cases.

A conventional solution to this problem is to have different modes—one pan mode and one text selection mode. This is a solution available in Adobe Acrobat Reader® 7.0. Here, in an application area on the display, there are buttons available, allowing the user to switch between the different modes. However, this method is cumbersome and inconvenient, forcing the user to know or recognize which mode is currently active each time the user wishes to perform either a text selection operation or a panning operation.

Consequently, there is a problem in how to provide a simple and intuitive way for a user to select data in a manner distinct from the conventional drag-method.

Because of the size and limited user interface of pocket computers, they are limited in the graphical user interface in general, and in the way multiple selection may be provided in list elements, in particular.

In the prior art, there are two known attempts to solve this problem.

The first option is a combined discontinuous and continuous multiple selection. This works as follows: A user may perform single selections by tapping a list item. If the user wants to perform discontinuous multiple selection, the user may press down a certain hardware button and tap any of the list items, which then either become selected or unselected according to their initial state. If the user wants to perform continuous multiple selection, the user may do so by pressing the stylus down on the display and dragging over the desired items, which then change their state to be selected if the state is initially unselected, or unselected if the state is initially selected. This method enables the user to perform drag and drop operations, but the user has to be very careful not to release the depressed hardware button during operation.

The other option is continuous multiple selection only. This works as follows: A user may perform single selections by tapping a list item. If the user wants to perform continuous multiple selection, the user may do so by pressing the stylus down on the display and dragging over the desired items, which then change their state to either selected or unselected according to their initial state. Discontinuous multiple selection is not possible with this method. This method disallows the user to perform drag and drop operations, as all dragging interactions with the list are interpreted as selections.

Consequently there is a need for an invention that allows a user to select both single list items and discontinuous list items in a convenient and efficient manner.

In graphical user interfaces with windows, such as Microsoft Windows or Mac OS X, there often comes a situation where the user needs to move the active window, displayed over other windows, to see content of an underlying passive window. This same basic need is present in all handheld devices that have windowed graphical user interfaces.

In a desktop environment, window overlapping is not as great a problem, as available display space is large, and a mouse can easily be used to drag windows to another available area of the display.

In handheld devices, however, available display space is limited and there is most often no free space where to drag the window. Furthermore, in most handheld devices, the windowing system is designed so that dialog windows can not be dragged nor hidden. This makes some important use cases (e.g. checking a telephone number from an underlying application view to input it in the active window) impossible to perform.

In Nokia's Series 90 UI design, the problem with window overlapping is solved by enabling the user to drag dialog windows around the display and then return them to the center of the display automatically when the stylus was lifted. This approach works as such, but it has two major disadvantages. Firstly, the movement of the dialog affects performance adversely. Secondly, if the dialog is very large, i.e. occupies most of the visible display area, dragging the window can be inconvenient for the user, as he/she may have to drag the window across a large part of the whole display.

In Microsoft's Pocket PC environment, the user may drag dialog windows freely with a stylus. This may result in a situation where the user drags the dialog outside the visible display area, which instantly prevents any further interaction with the dialog. Thus the user can not close the dialog and may have to restart the application, which may result in a data loss.

In a Matchbox X11 window manager for handheld devices created by Mr. Matthew Allum (http://freshmeat.net/projects/matchbox/), like for the Pocket PC environment, the problem is solved by allowing the user to drag active dialogs anywhere on the display.

Consequently, there is a need for an invention allowing a user to conveniently and safely temporarily hide a currently active window.

In window-based graphical user interfaces, such as Microsoft Windows or Mac OS X, there often comes a situation when the size of viewable content (e.g. text document or WWW page) exceeds the physical size of the display or the size of the graphical user interface window. In most cases, this is fixed by showing scrollbars at one or more sides of the visible screen window, from which the user can scroll the content.

This same basic need is even more obvious in all handheld devices that have windowed graphical user interfaces and limited available screen space.

In handheld devices usable with stylus, the conventional interaction required for scrolling content, i.e. press stylus down on the scroll bar and drag horizontally or vertically, is very tiring for the hand, as the scroll bars may be positioned anywhere on the display, providing no physical support to alleviate scrolling. Moreover, in a handheld device, because of limited display space, the scroll bars are typically quite small (thin) and may therefore be difficult to hit with a stylus—particularly if the handheld device is used in a moving environment.

This leads to poor overall hardware ergonomics during scrolling and can be very disturbing for the overall user experience of the device.

In window-based graphical user interfaces for desktop computers, such as Microsoft Windows or Macintosh OS X, there is often a basic need for the user to switch between running applications. The same basic need is present in hand-held devices that have windowed graphical user interfaces.

In a desktop environment, windows can be scaled and moved with a mouse, so that underlying windows can be seen behind the current window. Desktop environments also have other ways for showing running applications and switching between them. The Windows Task bar and the Macintosh OS X Dock are two common examples. Yet another common way is to provide an application list that may be shown in the middle of the display. The list is shown when the user presses a key combination (Alt+Tab for Windows and Linux, Cmd+Tab for Macintosh).

Most hand-held devices do not support multiple windows, nor do they provide for closing of applications. Therefore, such hand-held devices do not need to deal with the switching issue. Instead, devices with operating systems like the one in the Nokia 7710 Communicator, Symbian, Microsoft Pocket PC or Palm OS provide the user with a list of recently used applications.

The Windows CE hand-held operating system has a Task bar similar to desktop Windows. When an application is launched, its icon (and title) is shown in the Task bar. If another application is launched, its icon is shown next to the previous one. If the user wants to switch to the first application, he can tap its icon in the Task bar. These icons do not change their relative order when the user changes between applications.

In summary, a problem with the prior art in this respect is how to efficiently and intuitively switch between running applications on a hand-held device such as a pocket computer.

SUMMARY OF THE INVENTION

In view of the above, an objective of the invention is to solve or at least reduce the above-identified and other problems and shortcomings with the prior art, and to provide improvements to a pocket computer.

Generally, the above objectives and purposes are achieved by methods, pocket computers and user interfaces according to the attached independent patent claims.

A first inventive aspect is a method of operating a user interface in a pocket computer, the pocket computer being adapted for execution of different software applications, each application having a number of functions, each function when invoked providing a certain functionality to a user of the pocket computer, the method involving:

providing, on a display of said pocket computer, a number of selectable user interface elements, each user interface element representing a certain use aspect of said pocket computer, said certain use aspect being associated with certain functions of certain applications;

detecting selection by said user of a particular element among said user interface elements;

for the selected particular element, presenting on said display a number of selectable and task-oriented options, each such option being associated with a certain function of a certain application;

detecting selection by said user of a particular option among said options; and invoking the function associated with said particular option.

Said display may be touch-sensitive, wherein said selections are done by the user by pointing at the touch-sensitive display. Said selectable user interface elements are icons located at static positions on said display. The task-oriented options may be presented as menu items in a menu. A first use aspect of said pocket computer may be information browsing, and a second use aspect of said pocket computer may be electronic messaging.

Another expression of the first inventive aspect is a pocket computer having a user interface which includes a display and being adapted for execution of different software applications, each application having a number of functions, each function when invoked providing a certain functionality to a user of the pocket computer, the pocket computer being adapted to perform the method according to the first inventive aspect.

A second inventive aspect is a method for accepting input to select data items displayed on a touch sensitive display of a pocket computer further comprising a writing tool, comprising the steps of:

detecting a first tap of said writing tool in a first position at a first point in time, determining that selection of data is to be commenced by detecting a second tap of said writing tool in a position less than a threshold distance from said first position within a predetermined time from said first point in time, and if it is determined that selection of data is to be commenced, upon detecting movement of said writing tool to a second position, selecting data items between said first position and said second position.

Said data items may represent a subset of available content, wherein if it is not determined that selection of data is to be commenced, said method may comprise the further steps of:

determining that panning is to be commenced by detecting that said writing tool has moved after said first tap of said writing tool, and if it is determined that panning is to be commenced, detecting a second position of said writing tool, and performing a panning operation among said available content to display data items at a position offset by a difference between said first position and said second position.

Said content and data items may belong to a web browser application executing in said pocket computer.

Another expression of the second inventive aspect is a pocket computer adapted to perform the method according to the second inventive aspect.

Still another expression of the second inventive aspect is a method for accepting input to pan content and to select data items, displayed on a touch sensitive display of a pocket computer further comprising a writing tool, said data items representing a subset of available content, the method comprising the steps of:

detecting a first tap of said writing tool in a first position at a first point in time, determining that panning is to be commenced by detecting a second tap of said writing tool in a position less than a threshold distance from said first position within a predetermined time from said first point in time, if it is determined that panning is to be commenced, detecting a second position of said writing tool, and performing a panning operation among said available content to display data items at a position offset by a difference between said first position and said second position, if it is not determined that panning is to be commenced, determining that selection of data is to be commenced by detecting that said writing tool has moved after said first tap of said writing tool, and if it is determined that selection of data is to be commenced, upon detecting movement of said writing tool to a second position, selecting data items between said first position and said second position.

A third inventive aspect is a pocket computer comprising a zoom in button, a zoom out button and an input writing tool, being capable of displaying content on a display, wherein displayed content is a subset of available content, wherein said computer is capable of zooming in on displayed content on said display in response to a depression of said zoom in button, said computer being capable of zooming out on displayed content on said display in response to a depression of said zoom out button, and said computer being capable of panning available content on said display in response to a tap of said writing tool in a first position on said display, a move of said writing tool and a lift of said writing tool in a second position on said display.

A fourth inventive aspect is a method for navigating through hyperlinks shown on a display of a pocket computer, comprising the steps of:

receiving an input to shift focus to a subsequent hyperlink, determining what hyperlink is subsequent solely based on the geometrical position of said hyperlinks displayed on said display, and shifting focus to said hyperlink determined to be subsequent.

Said subsequent hyperlink may be a hyperlink before or after any hyperlink currently in focus.

Another expression of the fourth inventive aspect is a pocket computer adapted to perform the method according to the fourth inventive aspect.

A fifth inventive aspect is a method for changing a zoom factor of content shown on a display of a pocket computer, comprising the steps of:

receiving input to display a menu relative to a target position on said display, displaying said menu, comprising at least one menu item for changing said zoom factor, receiving input to change said zoom factor by detecting a menu item with new zoom factor being selected, and rendering said content with said new zoom factor, centered around said target position.

Said display may be a touch sensitive display, and said input to display a menu may be a depression on said touch sensitive display during a time period longer than a predetermined threshold value, or a double tap on said touch sensitive display.

Said content may belong to a web browser application executing on said pocket computer. Said menu may be a context sensitive menu.

Another expression of the fifth inventive aspect is a pocket computer adapted to perform the method according to the fifth inventive aspect.

A sixth inventive aspect is a method for browsing through previously visited web pages in a web browser application executing on a pocket computer comprising a display, the method comprising the steps of:

rendering a first web page on said display, accepting a first input to change to a new zoom factor for said first web page, rendering said first web page with said new zoom factor, accepting a second input to render a second web page, rendering a second web page with a zoom factor distinct from said new zoom factor for said first web page, accepting a third input to again render said first web page, and rendering said first web page with said new zoom factor.

Said third input may be an input to navigate back or forward through browser history.

Another expression of the sixth inventive aspect is a pocket computer adapted to perform the method according to the sixth inventive aspect.

A seventh inventive aspect is a method for accepting input to select at least one list item in a user interface element representing a list, said element being operable in a single selection mode or a multiple distinct selection mode, displayed on a touch sensitive display of a pocket computer further comprising a writing tool, said method comprising the steps of:

determining if said element is operating in said single selection mode, determining if said element is operating in a multiple distinct selection mode, detecting a first tap of said writing tool in a first position, selecting a first list item corresponding to said first position, detecting a first lift of said writing tool in a second position, which may be equal to said first position, detecting a second tap of said writing tool in a third position, if said element is determined to be operating in said single selection mode, deselecting said first list item, and selecting a list item corresponding to said third position.

Said element may further be operable in a range selection mode, wherein said method may comprise the further steps, prior to said step of detecting said second tap, of:

determining if said element is operating in said range selection mode, and if said element is determined to be operating in a range selection mode and said first list item is not equal to a second list item corresponding to said second position, selecting all list items from said first list item to said second list item.

A further step, prior to said step of selecting said second list item, may involve:

if said element is determined to be operating in said range selection mode, deselecting previously selected list items.

Optional steps may involve:

detecting a third tap in a position corresponding to a selected list item, detecting a third lift in a position corresponding to a second user interface element, and if said element is determined to be operating in the single selection or the range selection mode, providing data representing selected list items to said second user interface element.

Optional steps may involve:

if said element is determined to be operating in a multiple distinct selection mode, rendering a selection indicator adjacent to each selected list item.

Said selection indicator may be a check mark.

Optional steps may involve:

if said element is determined to be operating in the multiple distinct selection mode, detecting a third tap and a third lift of said writing tool in a position corresponding to a previously selected list item, and deselecting said previously selected list item.

Another expression of the seventh inventive aspect is a pocket computer adapted to perform the method according to the seventh inventive aspect.

An eighth inventive aspect is a method to temporarily hide a window, comprising a head area, displayed in a location on a touch sensitive display of a pocket computer further comprising a writing tool, said method comprising the steps of:

detecting a tap of said writing tool in a position corresponding to said head area of said window, hiding contents of said window, thereby exposing any content previously covered by said window, detecting a lift of said writing tool, and re-drawing the content of said window in said location.

A further step, after said step of hiding, may involve:

drawing a box outline indicating said location of said window.

Said window may be a dialog.

Another expression of the eighth inventive aspect is a pocket computer adapted to perform the method according to the eighth inventive aspect.

A ninth inventive aspect is a method for scrolling content in a window displayed on a touch sensitive display on a pocket computer, said display further displaying a remote scroll element, the method comprising the steps of:

detecting a tap of a writing tool in a first position on said remote scroll element, based on said position of said tap, determining a direction to scroll content, based on said position of said tap, determining a distance to scroll content, and scrolling said content said distance in said direction to a new position.

Said remote scroll element may comprise a bitmap image. Alternatively or in addition, an area on said touch sensitive display that underlies said remote scroll element may be used for presentation of information such as at least one non-selectable indicator.

Said window may comprise a scrollbar, having a scroll thumb, wherein a further step may involve:

moving said scroll thumb to correspond to said new position of content.

Said remote scroll element may be located adjacent to said window, and/or along one edge of said display. Said window may be located disjunctive from said remote scroll element.

Another expression of the ninth inventive aspect is a pocket computer adapted to perform the method according to the ninth inventive aspect.

A tenth inventive aspect is a method for scrolling content in a window displayed on a touch sensitive display of a pocket computer, said display further displaying a scrollbar comprising a scroll thumb movable in a trough, comprising the steps of:

detecting a tap of a writing tool in a tapping position in said trough, scrolling said content, including updating a position of said scroll thumb in said trough accordingly by moving said scroll thumb in said trough, detecting a lift of said writing tool, and once lift of said writing tool is detected, stopping said scrolling of content, wherein, in said step of scrolling, said scrolling is allowed to continue such that said position of said scroll thumb moves past said tapping position in said trough.

Said step of scrolling said content may scroll content one page at a time. Said position may be distinct from said scroll thumb.

Another expression of the tenth inventive aspect is a pocket computer adapted to perform the method according to the tenth inventive aspect.

An eleventh inventive aspect is a graphical user interface for a pocket computer having a display and being adapted for execution of different software applications, the user interface including an application switcher panel capable of presenting a plurality of icons on said display, each icon being associated with a respective application executed on said pocket computer and being selectable by a user so as to cause activation of the associated application, wherein the icons have an order in the application switcher panel and wherein this order depends on an order in which the associated applications have been active in the past, specifically such that the icon associated with a most recently active application has a first position in the application switcher panel.

The graphical user interface may be further adapted, upon launching of a new application, to insert an icon associated with said new application at said first position in the application switcher panel while shifting the positions of existing icons in the application switcher panel by one position backwards.

In one embodiment, only a predetermined maximum number of positions for icons may be allowed in said application switcher panel wherein, for an icon that has been shifted out from the application switcher panel, the application associated therewith may be activated through selection of a menu item in a menu on said display.

Another expression of the eleventh inventive aspect is a pocket computer having a graphical user interface as defined above.

A twelfth inventive aspect is a pocket computer having a display with a user interface and a controller, the controller being adapted for execution of different utility applications, each utility application providing certain nominal functionality to a user when executed as an active application in said user interface, the pocket computer having a home application adapted for simultaneous provision on said display of a number of limited application views to respective ones among said utility applications, wherein each such limited application view enables the user to access a limited part of the nominal functionality of a respective utility application without executing this utility application as an active application.

A thirteenth inventive aspect is a pocket computer having
an apparatus housing;
a touch-sensitive display provided at a first side surface of said apparatus housing;
at least one key for navigation among content shown on said display; and
at least one key for performing zooming on content shown on said display,
wherein one of said at least one key for navigation and said at least one key for performing zooming is located at said first side surface of said apparatus housing, whereas another one of said at least one key for navigation and said at least one key for performing zooming is located at a second side surface of said apparatus housing, non-parallel to said first side surface, the location of said keys being such that both keys are within reach of a typical user's hand when holding the apparatus housing with one hand and without shifting grip.

Throughout this document, a "writing tool" is an object used for providing input on a touch-sensitive display, not only in the form of writing (e.g. characters and text) but also in the form of control actions such as pointing, tapping ("clicking"), pressing and dragging. Thus, a "writing tool" may be a stylus, pen, a user's finger or any other physical object suitable for interaction with the touch-sensitive display.

Generally, each of the methods of the inventive aspects referred to in this document may be performed by a corresponding computer program product, i.e. a computer program product directly loadable into a memory of a digital computer and comprising software code portions for performing the method in question.

As used herein, a "pocket computer" is a small portable device with limited resources in terms of e.g. display size, data processing power and input means. In one embodiment, the pocket computer is a mobile terminal accessory particularly designed for electronic browsing and messaging.

Other objectives, features and advantages of the present invention will appear from the following detailed disclosure, from the attached dependent claims as well as from the drawings.

BRIEF DESCRIPTION OF THE DRAWINGS

Embodiments of different inventive aspects will now be described in more detail, reference being made to the enclosed drawings.

FIG. 23 illustrate new content loaded in a web browser.

DETAILED DESCRIPTION OF THE INVENTION

Figure 1:
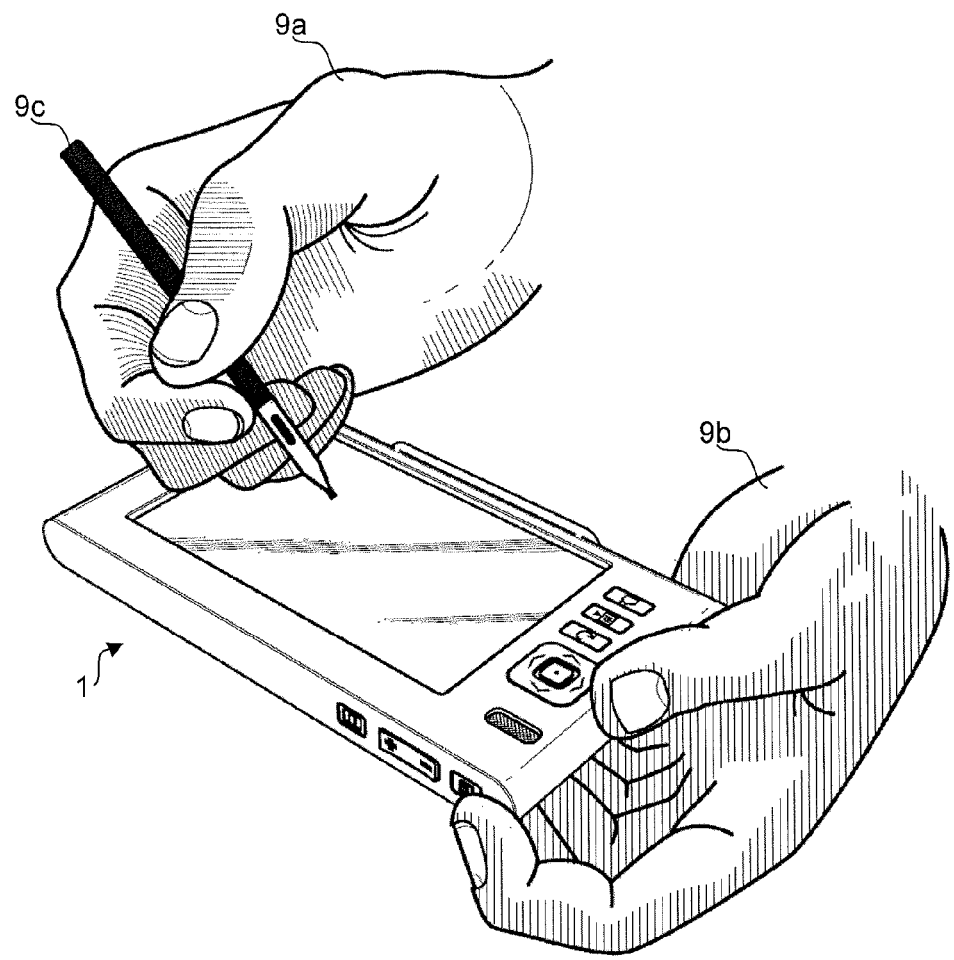
FIG. 1 is a perspective view of a pocket computer according to one embodiment, shown in a typical operating position in the hands of a user.

The pocket computer 1 of the illustrated embodiment comprises an apparatus housing 2 and a large touch-sensitive display 3 provided at the surface of a front side $2_f$ of the apparatus housing 2. Next to the display 3 a plurality of hardware keys 5a-d are provided, as well as a speaker 6.

More particularly, key 5a is a five-way navigation key, i.e. a key which is depressible at four different peripheral positions to command navigation in respective orthogonal directions ("up", "down", "left", "right") among information shown on the display 3, as well as depressible at a center position to command selection among information shown on the display 3. Key 5b is a cancel key, key 5c is a menu or options key, and key 5d is a home key.

In addition, a second plurality of hardware keys 4a-c is provided at the surface of a first short side $2_u$ of the apparatus housing 2. Key 4a is a power on/off key, key 4b is an increase/decrease key, and key 4c is for toggling between full-screen and normal presentation on the display 3.

At the surface of a second short side $2_l$ of the apparatus housing 2, opposite to said first short side $2_u$, there are provided an earphone audio terminal 7a, a mains power terminal 7b and a wire-based data interface 7c in the form of a serial USB port.

Figure 5:
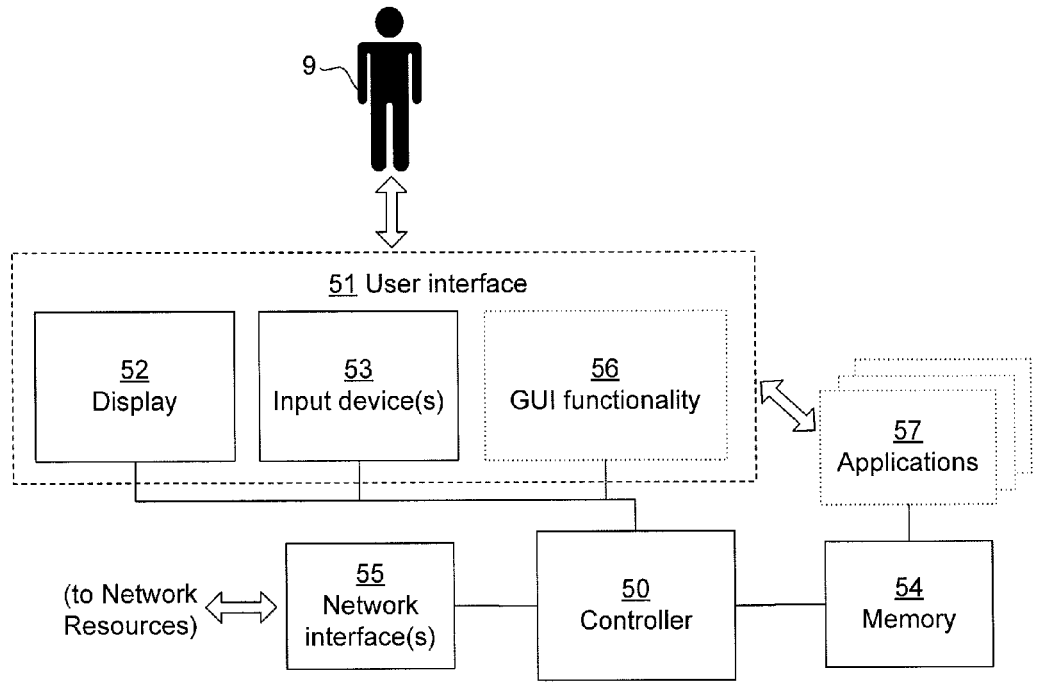
FIG. 5 is a schematic block diagram of the pocket computer according to the previous drawings.

Being touch-sensitive, the display 3 will act both as a visual output device 52 and as an input device 53, both of which are included in a user interface 51 to a user 9 (see FIG. 5). More specifically, as seen in FIG. 1, the user 9 may operate the pocket computer 1 by pointing/tapping/dragging with a stylus 9c, held in one hand 9a, on the surface of the touch-sensitive display 3 and/or by actuating any of the hardware keys 4a-c, 5a-d (which also are included as input devices in the user interface 51) with the thumb and index finger of the other hand 9b.

As seen in FIG. 5, the pocket computer 1 also has a controller 50 with associated memory 54. The controller is responsible for the overall operation of the pocket computer 1 and may be implemented by any commercially available CPU (Central Processing Unit), DSP (Digital Signal Processor) or any other electronic programmable logic device. The associated memory may be internal and/or external to the controller 50 and may be RAM memory, ROM memory, EEPROM memory, flash memory, hard disk, or any combination thereof.

The memory 54 is used for various purposes by the controller 50, one of them being for storing data and program instructions for various pieces of software in the pocket computer 1. The software may include a real-time operating system, drivers e.g. for the user interface 51, as well as various applications 57.

Many if not all of these applications will interact with the user 9 both by receiving data input from him, such as text input through the input device 53, and by providing data output to him, such as visual output in the form of e.g. text and graphical information presented on the display 52. Non-limiting examples of applications are an Internet/WWW/WAP browser application, a contacts application, a messaging application (email, SMS, MMS), a calendar application, an organizer application, a video game application, a calculator application, a voice memo application, an alarm clock application, a word processing application, a spreadsheet application, a code memory application, a music player application, a media streaming application, and a control panel application. Some applications will be described in more detail later. GUI (graphical user interface) functionality 56 in the user interface 51 controls the interaction between the applications 57, the user 9 and the elements 52, 53 of the user interface.

Text input to the pocket computer 1 may be performed in different ways. One way is to use a virtual keyboard presented on the display. By tapping with the stylus 9c on individual buttons or keys of the virtual keyboard, the user 9 may input successive characters which aggregate to a text input shown in a text input field on the display. Another way to input text is by performing handwriting on the touch-sensitive using the stylus 9c and involving handwriting recognition. Word prediction/completion functionality may be provided.

To allow portable use, the pocket computer 1 has a rechargeable battery.

The pocket computer also has at least one interface 55 for wireless access to network resources on at least one digital network. More detailed examples of this are given in FIG. 4. Here, the pocket computer 1 may connect to a data communications network 32 by establishing a wireless link via a network access point 30, such as a WLAN (Wireless Local Area Network) router. The data communications network 32 may be a wide area network (WAN), such as Internet or some part thereof, a local area network (LAN), etc. A plurality of network resources 40-44 may be connected to the data communications network 32 and are thus made available to the user 9 through the pocket computer 1. For instance, the network resources may include servers 40 with associated contents 42 such as www data, wap data, ftp data, email data, audio data, video data, etc. The network resources may also include other end-user devices 44, such as personal computers.

Figure 4:
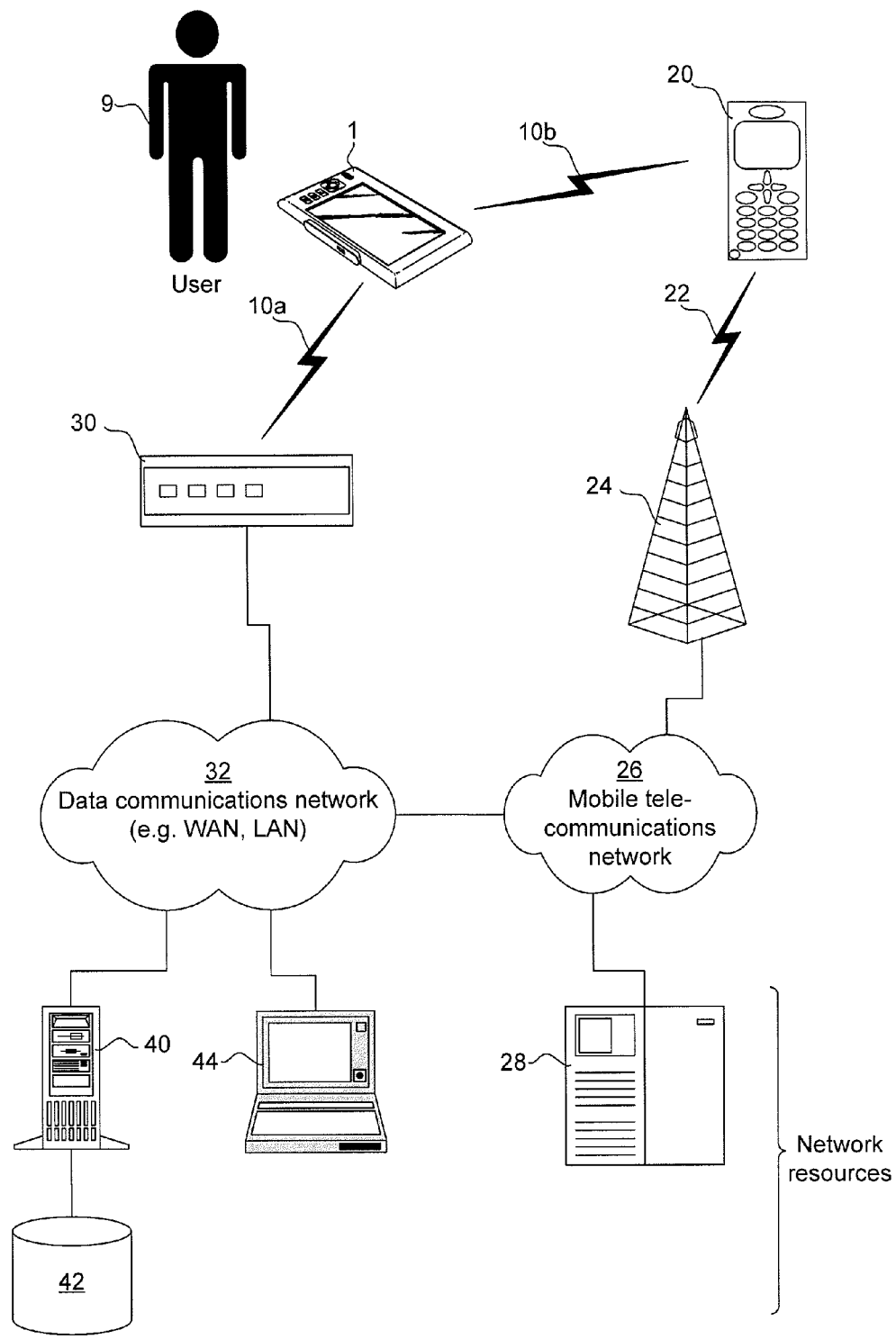
FIG. 4 illustrates a computer network environment in which the pocket computer of FIGS. 1-3 advantageously may be used for providing wireless access for the user to network resources and remote services.

A second digital network 26 is shown in FIG. 4 in the form of a mobile telecommunications network, compliant with any available mobile telecommunications standard such as GSM, UMTS, D-AMPS or CDMA2000. In the illustrated exemplifying embodiment, the user 9 may access network resources 28 on the mobile telecommunications network 26 through the pocket computer 1 by establishing a wireless link 10b to a mobile terminal 20, which in turn has operative access to the mobile telecommunications network 26 over a wireless link 22 to a base station 24, as is well known per se. The wireless links 10a, 10b may for instance be in compliance with Bluetooth™, WLAN (Wireless Local Area Network, e.g. as specified in IEEE 802.11), HomeRF or HIPERLAN. Thus, the interface(s) 55 will contain all the necessary hardware and software required for establishing such links, as is readily realized by a man skilled in the art.

Figure 2:
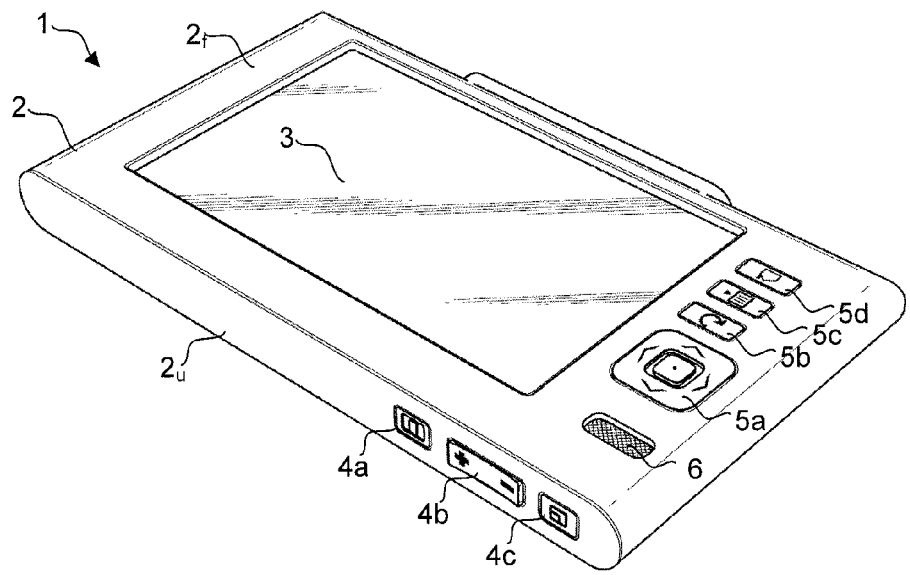
FIGS. 2 and 3 are different perspective views of the pocket computer of FIG. 1.
Figure 3:
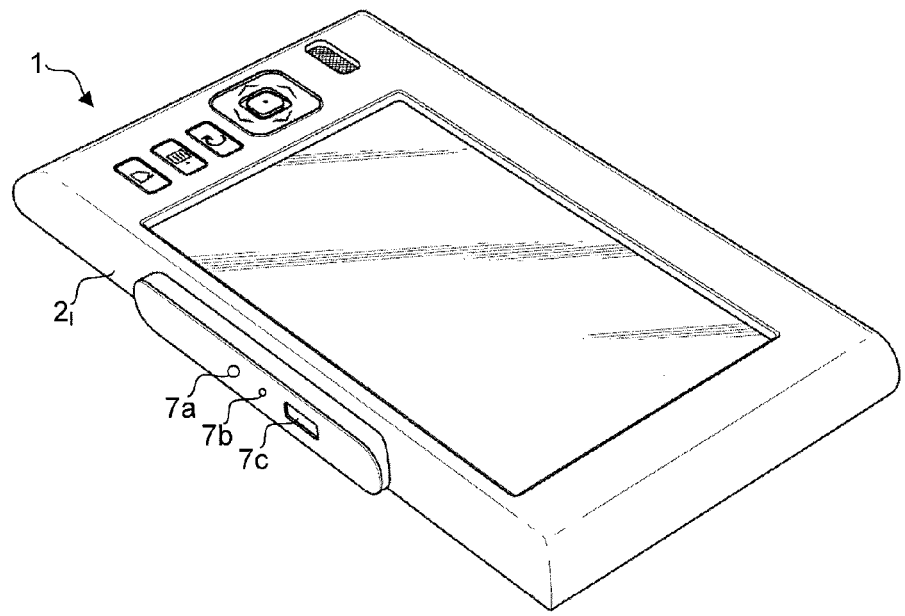
Figure 6:
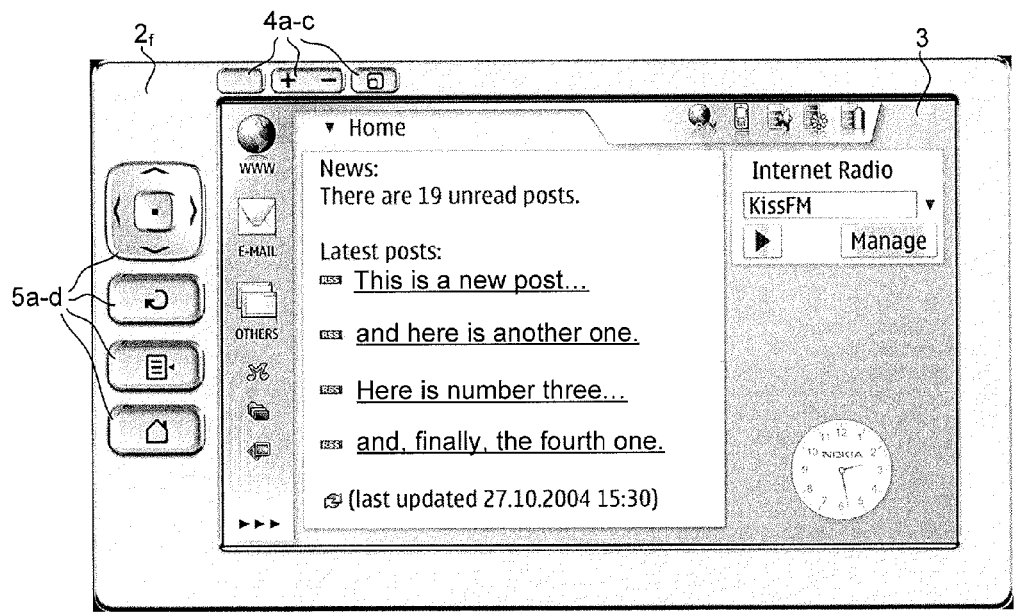
FIG. 6 is a front view of the pocket computer, demonstrating a typical display screen layout of its user interface.

FIG. 6 shows a front view of the pocket computer and indicates a typical display screen layout of its user interface. A typical disposition of the display screen layout, presenting a view of a home application (i.e., a start or base view that the user may return to whenever he likes), is shown in more detail in FIG. 7. In FIG. 6, the hardware keys 5a-d are shown at their actual location to the left of the display 3 on the front side surface $2_f$ of the apparatus housing 2, whereas, for clarity reasons, the hardware keys 4a-c are illustrated as being located above the display 3 on the front side surface $2_f$ even while they actually are located at aforesaid first short side surface $2_u$ (FIG. 2).

Figure 7:
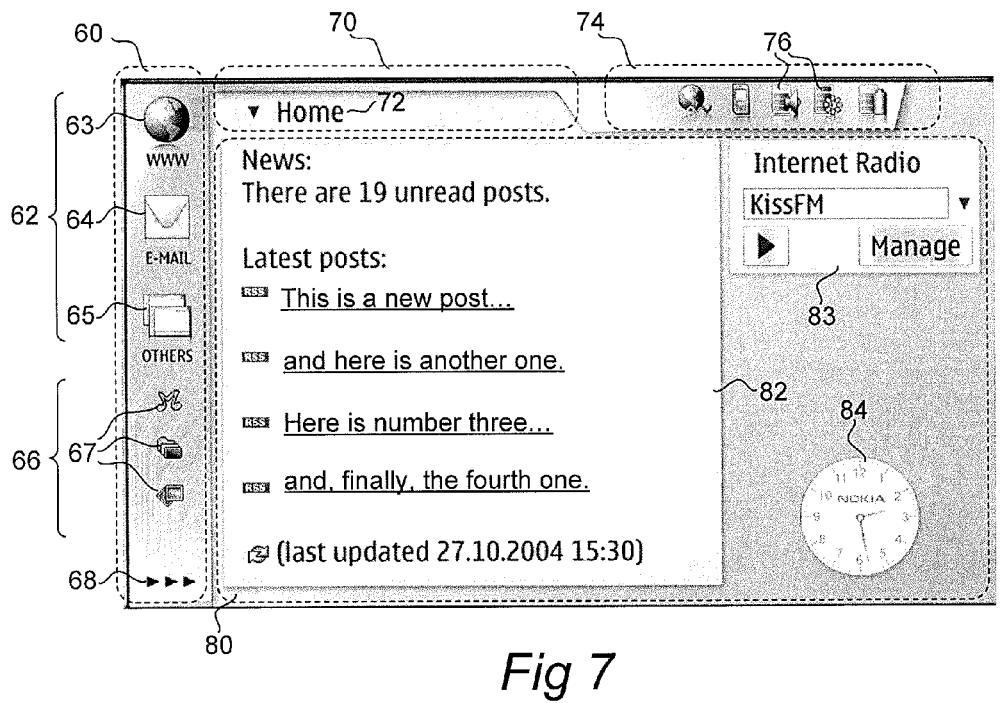
FIG. 7 illustrates a typical disposition of the display screen layout, including a home view.

With reference to FIG. 7, the display screen layout of the display 3 is divided into four main areas: a task navigator 60, a title area 70, a status indicator area 74 and an application area 80.

Figure 9:
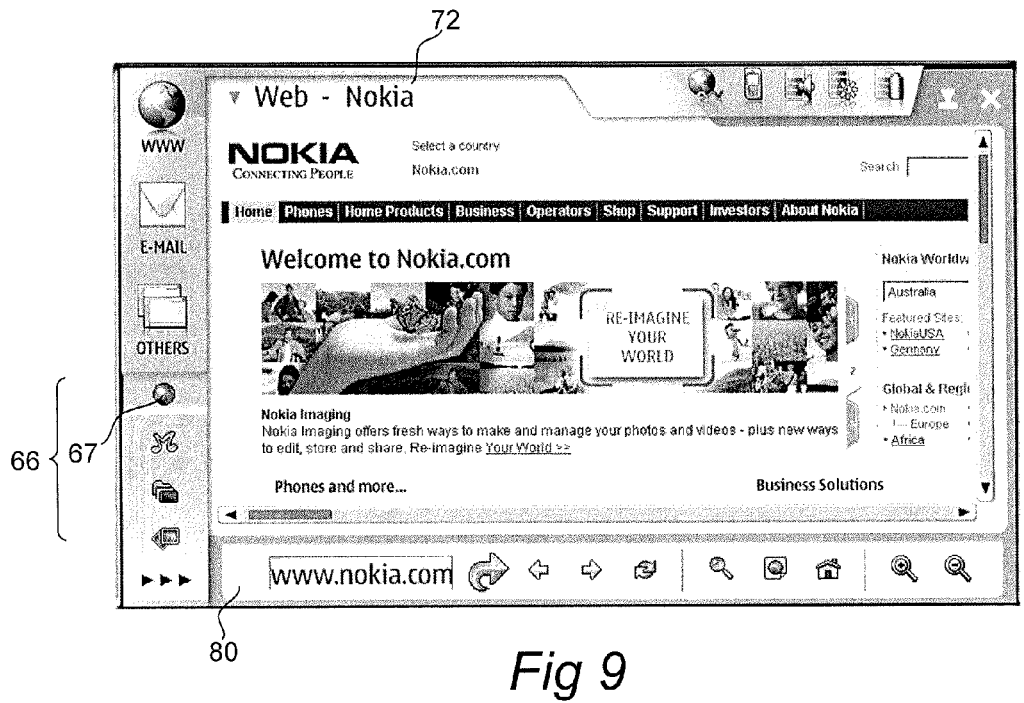
Figure 10:
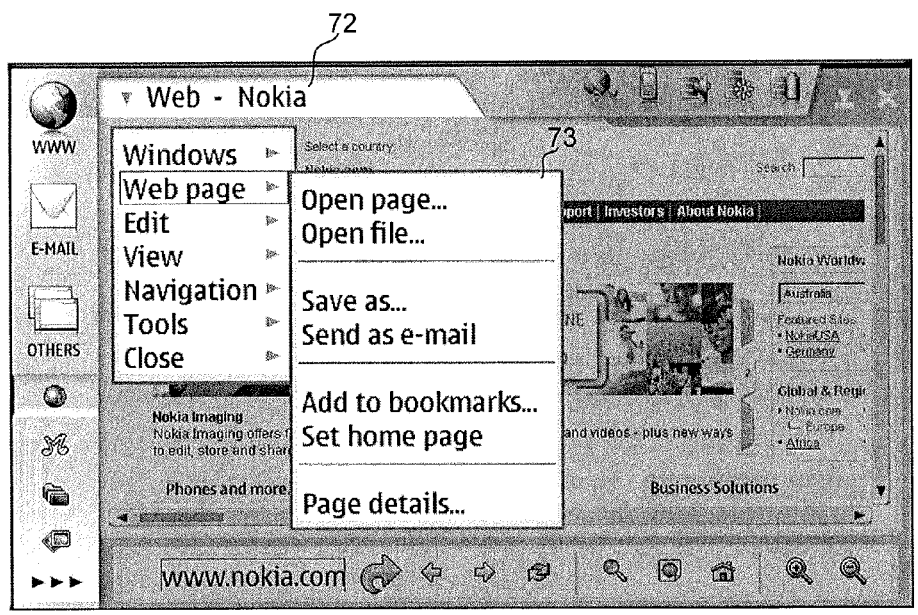

The application area 80 is used by a currently active application to present whatever information (content) is relevant and also to provide user interface controls such as click buttons, scrollable list, check boxes, radio buttons, hyper links, etc, which allow the user to interact with the currently active application by way of the stylus 9c. One example of how a currently active application, in the form of a web browser, uses the application area 80 in this manner is shown in FIG. 9. A name or other brief description of the currently active application (e.g. the web browser) and a current file or data item (e.g. the current web page) is given at 72 in the title area 70 (e.g. "Web—Nokia"). In addition, as seen in FIG. 10, by tapping in the title area 70, the user may access an application menu 73 of the currently active application.

The status indicator area 74 contains a plurality of icons 76 that provide information about system events and status, typically not associated with any particular active application. As seen in FIG. 7, the icons 76 may include a battery charge indicator, a display brightness control, a volume control as well as icons that pertain to the network interface(s) 55 and the ways in which the pocket computer connects to the network(s) 32, 26.

The task navigator 60, title area 70 and status indicator area 74 always remain on screen at their respective locations, unless full screen mode is commanded by depressing the hardware key 4c. In such a case, the currently active application will use all of the display 3 in an expansion of the application area 80, and the areas 60, 70 and 74 will thus be hidden.

The task navigator 60 has an upper portion 62 and a lower portion 66. The upper portion 62 contains icons 63-65 which when selected will open a task-oriented, context-specific menu 90 to the right of the selected icon (see FIG. 8, FIG. 11). The context-specific menu 90 will contain a plurality of task-oriented menu items 91, and the user may navigate among these menu items and select a desired one either by the navigation key 5a or by pointing at the display 3. The menu 90 may be hierarchical. The lower portion 66 represents an application switcher panel with respective icons 67 for each of a plurality of launched applications.

Figure 8:
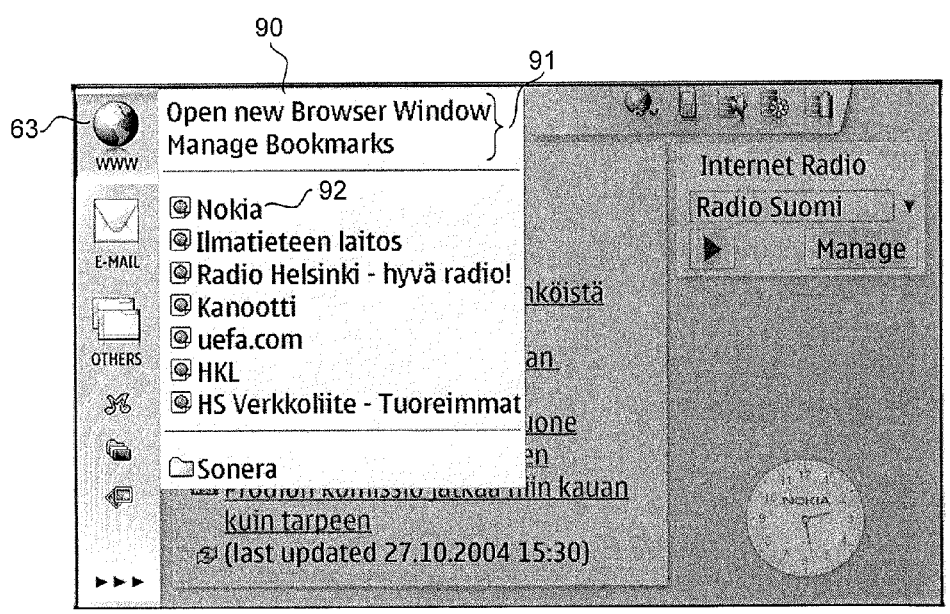
FIGS. 8-12 illustrate a task-oriented manner of operating the user interface as well as display screen layouts for certain typical applications executed in the pocket computer.
Figure 13:
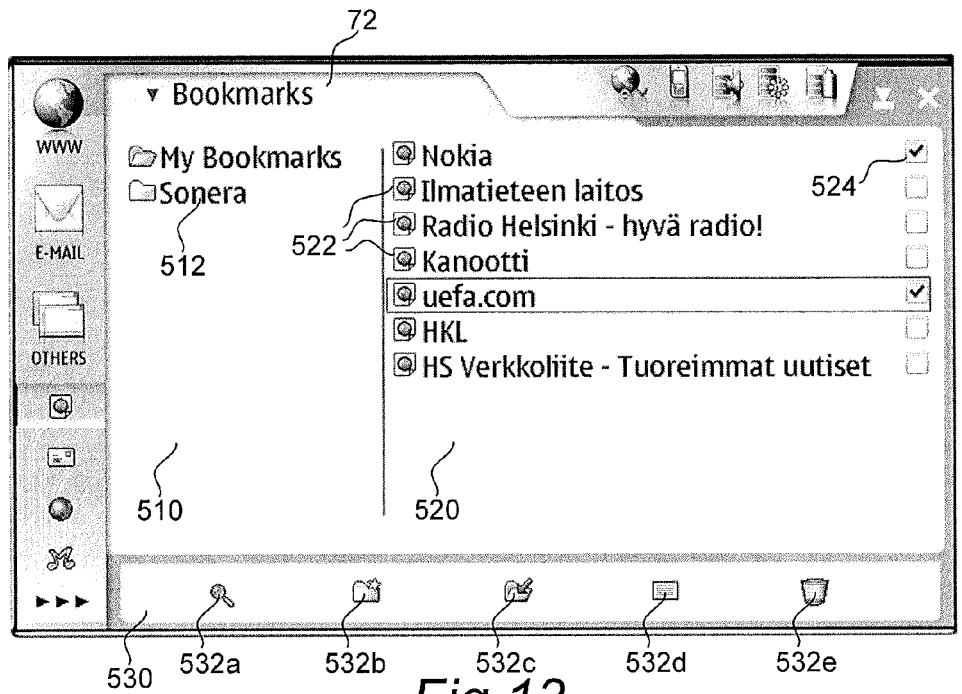
FIGS. 13-14 illustrate display screen layouts of a bookmark manager application.
Figure 14:
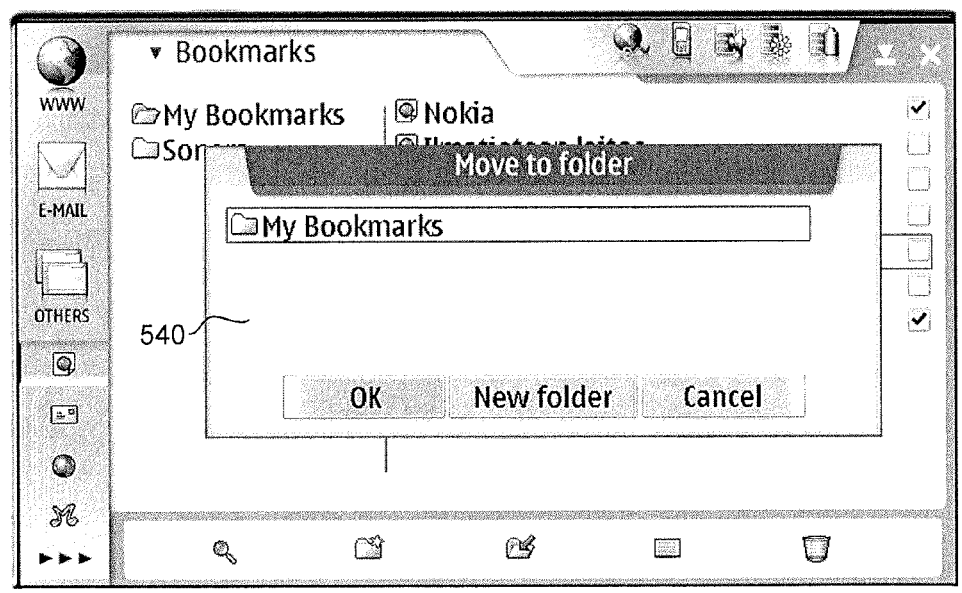

The upper portion 62 of the task navigator 60 will now be described in more detail. The topmost icon 63 is used for accessing tasks related to information browsing. The available tasks are presented as menu items 91 in menu 90, as seen in FIG. 8. More particularly, the user 9 may choose between opening a new browser window (FIG. 9), or managing bookmarks. Selecting of any of these menu items 91 will cause launching of the associated application (a browser application as seen in FIG. 9 or a bookmark manager as seen in FIGS. 13-14), or switching to such application if it is already included among the active ones, and also invocation of the appropriate functionality therein. In addition, the menu 90 contains a set of direct links 92 to certain web pages. In the disclosed embodiment, this set includes bookmarks previously defined by the user 9, but in other embodiments it may include the most recently visited web sites.

Figure 11:
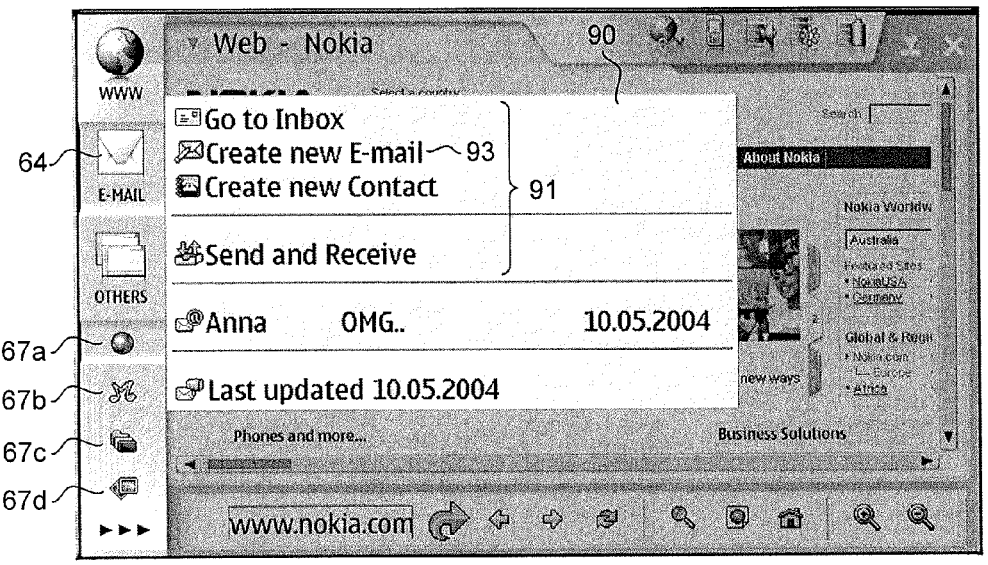
Figure 12:
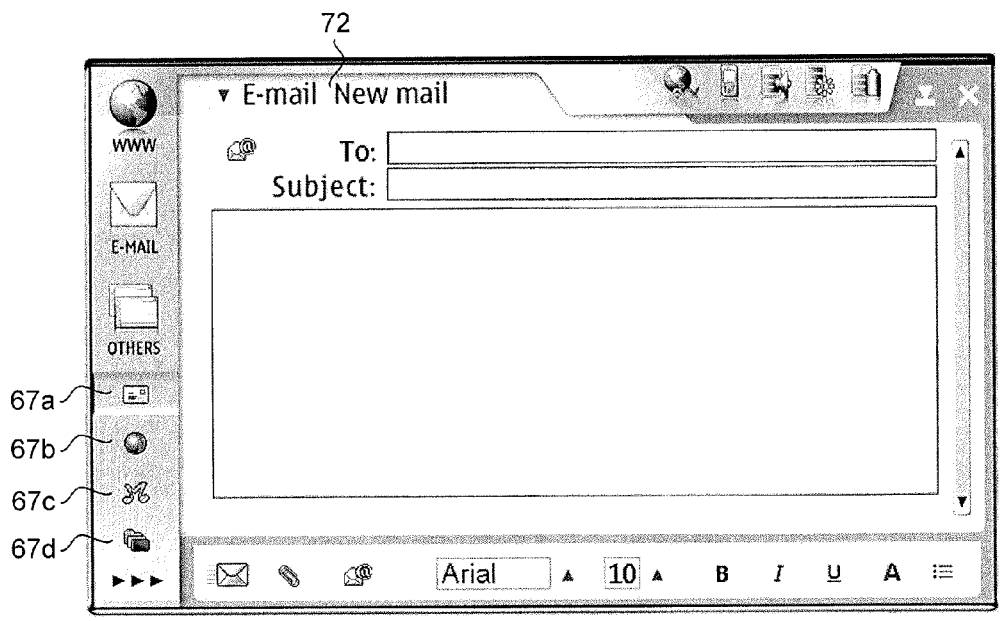

The second icon 64 is used for accessing tasks related to electronic messaging, as is seen in FIGS. 11 and 12.

Thus, the icons 63 and 64 allow the user 9 to operate his pocket computer in a task-oriented manner. By simply clicking on the desired icon which represents a common use aspect, the user will be presented with a list of various tasks that can be undertaken for that use aspect, instead of a conventional list of the available applications as such. This will make it easier to operate the pocket computer 1, since a typical user 9 is most often task-driven rather than application-driven. For instance, if the user realizes that he needs to exchange information with someone, it is more intuitive to click on an icon 64 that represents this use aspect (namely electronic messaging) and have the various available tasks 91 presented in a selectable menu 90 (FIG. 11), than to navigate in a conventional application-oriented menu (or click among a group of shortcut desktop icons representing respective applications), decide which application that is the appropriate one, select this application to launch it, then invoke the application menu of the launched application and navigate in this application menu so as to finally arrive at the appropriate menu item that will perform what the user needed in the first place. If for instance a new email message is what the user needs, he may conveniently click on icon 64, as seen in FIG. 11, and directly select the second menu item 93 shown in the task-oriented menu 90, whereupon the email messaging application will be automatically launched/ switched to and the appropriate functionality will be invoked by presenting a create new email dialog 72, as seen in FIG. 12.

Selection of the third icon 65 will cause presentation of a menu 90 with links to other tasks that are available, e.g. the various ones among the applications 57 that are not related to information browsing or electronic messaging.

Since the icons 63-65 represent use aspects that are likely to be frequently needed by the user 9, they remain static in the upper part 62 of the task navigator 60 and are thus constantly accessible.

The lower portion 66 of the task navigator 60 will now be described in more detail. As already mentioned, it represents an application switcher panel with respective icons 67 for each of a plurality of launched applications, i.e. running applications that are executed by the controller 50. Among such running applications, one will be active in the sense that it has control over the application area 80 on the display 3.

The user 9 may conveniently use the application switcher panel 66 for switching to a desired application by tapping with the stylus 9c on the corresponding icon 67. A help text, preferably containing the application's title and a current file name, etc, if applicable, may conveniently be presented on the display 3 next to the icon pointed at, so as to guide the user further. When the user lifts the stylus 9c, the application corresponding to the icon pointed at will be switched to.

In contrast to the icons 63-65 in the upper portion 62, the icons 67 in the application switcher panel 66 have a dynamic appearance; icons may change order, appear and disappear over time. More specifically, in the disclosed embodiment a maximum of four different running applications will be represented by respective icons 67 in the application switcher panel 66. The order among the icons 67 is such that the icon for the most recently active application will be shown at the topmost position, whereas the icon for the application that was active before the most recently active application will be shown immediately below, etc.

Often, the one most recently active application, represented by the topmost icon, will be the one that has current control over the application area 80. This is seen for instance in FIG. 11 (the topmost icon being labeled 67a and containing a browser symbol that represents the currently active web browser application). In such a case, the topmost icon 67a is shown with a "depressed" appearance, again as seen in FIG. 11. However, when the home application is the currently active one, as seen in FIG. 6, none of the icons 67 represents the currently active home application, and therefore no icon is shown depressed.

As appears from the above, the vertical order of the application switcher icons from top to bottom represents a historical order in which the four most recently used applications have been active. When a switch is done from a currently active application to another one, the order of the icons will be updated accordingly. This is shown in FIGS. 11 and 12. In FIG. 11, the web browser application is active and is thus represented by the topmost icon 67a. The second icon

67*b* represents an audio player application that was active before the web browser application was launched, whereas the third and fourth icons 67*c* and 67*d* represent a file manager application and an image viewer application, respectively, that were active before that.

Now, when the user 9 invokes the messaging application by selecting the menu item 93 in the afore-described task-oriented menu 90, the messaging application becomes active and its icon takes the topmost position 67*a*, as seen in FIG. 12. At the same time, the existing icons 67*a-c* of FIG. 11 are shifted one vertical position downwards, so that the web browser icon (formerly at 67*a*) takes the second position at 67*b*, the audio player icon moves to the third position 67*c*, and the file manager icon goes to the lowermost position 67*d*. The formerly shown image viewer icon disappears from the application switcher panel 66, but the image viewer application is still running.

By tapping an application switcher menu button (or "more" button) 68, an application switcher menu will be presented in a popup window on the display 3. This application switcher menu will contain menu items for all running applications, including the four most recent ones which are also represented by icons 67*a-d* in the application switcher panel 66, as well as those less recent applications the icons of which have been moved out from the application switcher panel 66 (such as the image viewer icon in the example described above). By selecting any desired menu item in the application switcher menu, the user 9 will cause a switch to the corresponding application. The application switcher menu may also include a menu item for the home application, as well as certain handy application control commands, such as "Close all applications".

If the user closes the active application, the topmost icon 67*a* will be removed from the application switcher panel 66, and the rest of the icons 67*b-d* will be shifted one position upwards in the panel. The application for the icon that now has become the topmost one will be switched to.

Certain inventive aspects relate to drag and drop functionality, as will be described in more detail in later sections of this document. It is to be noticed already here that the application switcher panel 66 is particularly well suited for use together with drag and drop functionality. Thus, using the stylus 9*c*, the user 9 may make a selection of content presented in the application area 80 for a first application, which is currently active, and drag the selected content to a desired one of the icons 67 in the application switcher panel 66. This will cause activation of an associated second application which will take control over the application area 80 and replace the first application as the currently active one. Then, the user may proceed and drag the stylus to a desired input field of this second application in the application area 80, and finally lift the stylus 9*c*, wherein the selected content from the first application will be pasted into the second application.

The particulars and functionality of the above-described application switcher panel 66 make switching between applications both fast and intuitive, and also clearly inform the user of the applications which are currently running as well as the order between them.

The home application 72 of FIG. 7 will now be described in more detail. Typically, the home application will be activated at start-up of the pocket computer 1. During ongoing use of the pocket computer 1, irrespective of whatever other application that is currently active, the user 9 may always return to the home application by pressing the home key 5*d* on the front surface 2*f* of the apparatus housing 2. Another way of invoking the home application is through the application switcher menu button 68, as has been described above.

As seen in FIG. 7, in this embodiment the home application contains three application views 82, 83 and 84 on the display 3. Each application view is a downscaled version of the application view of another application 57. Thus, among all the functionality nominally provided by such another application 57, the application view in the home application will only provide access to limited parts thereof. For instance, application view 82 in FIG. 7 represents a news application (e.g. Usenet news) and provides a limited view of this application by displaying the number of unread posts together with a few of the latest posts. Tapping on any of these latest posts will cause presentation of the contents of the post in question. If the user wants to access the complete functionality of the news application, he may switch to this application through e.g. the application switcher menu button 68 (as described above), or the "Others" icon 65 in the upper part 62 of the task navigator 60. In another embodiment, tapping on a post in the application view 82 may directly cause launching (if not already running) of or switching to the news application.

The application view 83 represents an Internet radio application and gives a limited view of its functionality. By tapping on a "Manage" button therein, the user may invoke the actual Internet radio application to access its entire functionality. The application view 84 represents a Clock application.

The interaction between such a limited application view 82, 83, 84 and the actual application it represents may be implemented using push technique, as is readily realized by a skilled person.

In one embodiment, the user may configure which application views to include in the home application, and some particulars of them.

Using only limited resources in terms of memory, CPU load and display screen space, the home application gives the user 9 a very convenient overlook view of certain applications that he probably likes to access frequently.

The bookmark manager 72 previously mentioned will now be described in more detail. As seen in FIGS. 13 and 14, the bookmark manager divides the application area into three parts 510, 520 and 530. Part 510 is a storage hierarchy view, showing a current structure of folders 512 for bookmarks in the pocket computer 1. The user 9 may select any of these folders by tapping on it with the stylus 9*c*, wherein the contents of this folder will open up into the second part 520, which lists all bookmarks 522 in the present folder 512. The user 9 may also create or delete such folders by tapping on a respective icon 532*b*, 532*e* in the third part 530.

By tapping on a desired bookmark 522 the web browser application will be invoked, and the web page defined by the bookmark in question will be visited. Moreover, by tapping in a check box 524 provided to the right of each bookmark 522, the user may select one or more of the bookmarks 522. For such selected bookmark(s), further operations may be commanded by tapping on for instance an edit bookmark icon 532*a*, a delete bookmark icon 532*e* or a move bookmark icon 532*c*. If the move bookmark icon 532*c* is tapped on, a Move to folder dialog 540 will be shown, as is seen in FIG. 14.

Thus, the bookmark manager provides many ways for the user 9*c* to manage his selection of bookmarks in a convenient manner.

Whenever the terms press and lift are used in this document, it is to be understood that this may be implemented using the stylus 9c on the touch sensitive display 3, a mouse, a trackball or any other suitable pointer input technology.

Figure 15A:
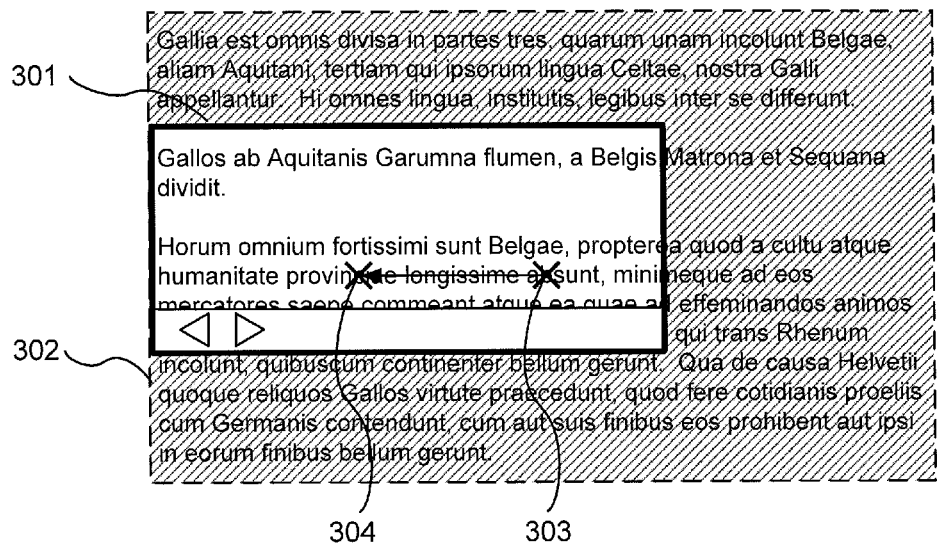
FIGS. 15A and 15B illustrate how a user may pan content in an embodiment of an inventive aspect.
Figure 15B:
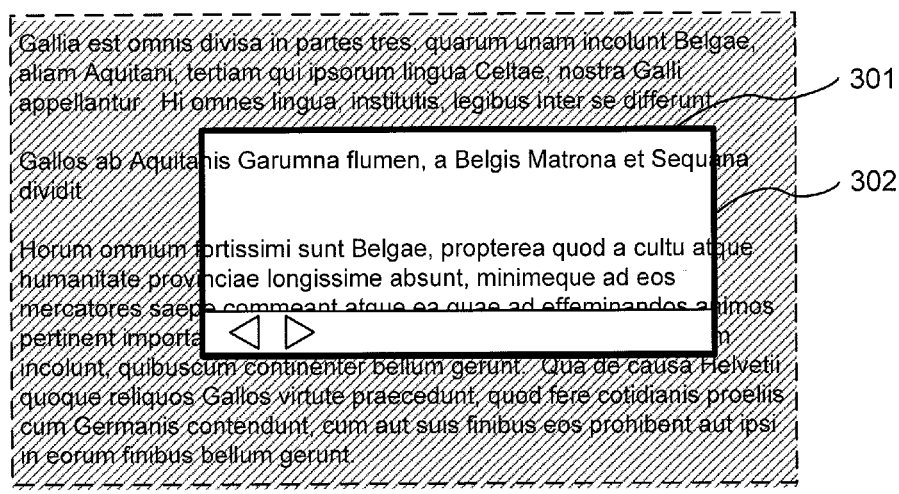

FIGS. 15A and 15B illustrate how the user may pan content in an embodiment of an inventive aspect. Content 302, or data, available for display is larger than what a display view 301 of the pocket computer 1 can physically render. As known in the art, the display view 301 then shows a subset of the content 302 that can fit into the space defined by the display view 301.

As shown in FIG. 15A, to pan content, the user presses the stylus 9c in a first position 303 and, while holding the stylus 9c pressed, moves the stylus 9c to a second position 304, where the stylus 9c is lifted. This effects a movement of the content according to the movement of the stylus 9c. So in this example, as the stylus is moved to the left, the underlying available content is moved to the left, creating a resulting view 301 as can be seen in FIG. 15B. In other words, panning may be performed with a tap and drag.

Figure 16A:
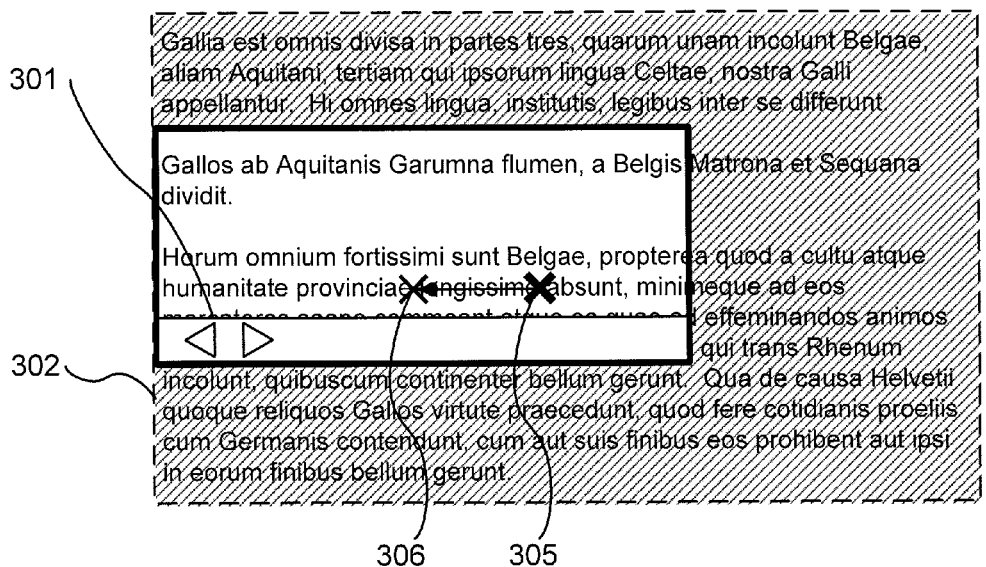
FIGS. 16A and 16B illustrate how a user may select text in an embodiment of an inventive aspect.
Figure 16B:
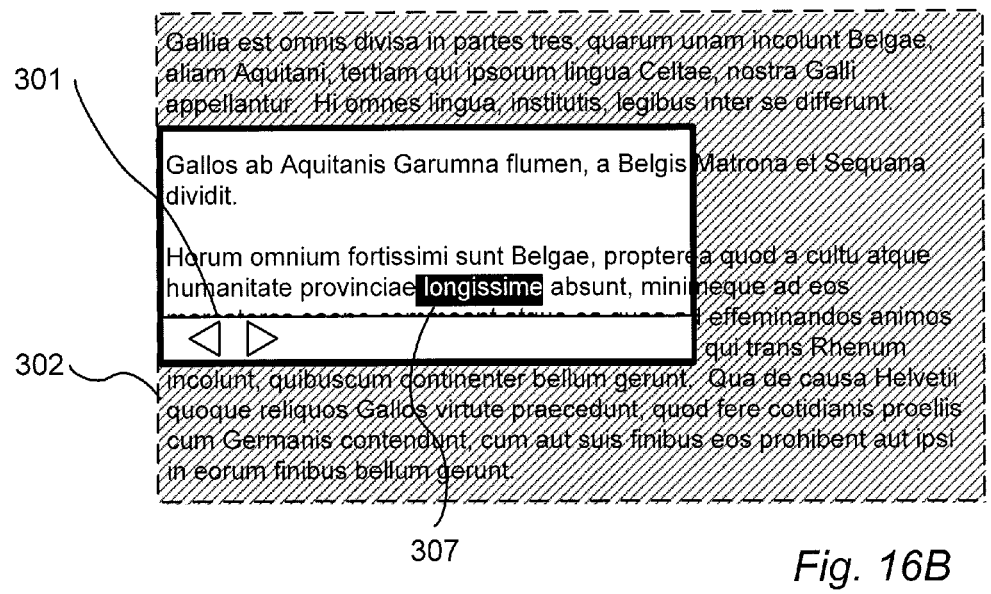

FIGS. 16A and 16B illustrate how the user may select text in an embodiment of an inventive aspect. Like for the situation explained in conjunction with FIGS. 15A and 15B, content 302, or data, available for display is larger than what the display view 301 of the pocket computer 1 can physically render. As is known in the art, the display view 301 then shows part of the content 302 that can fit into the space defined by the display view 301.

To select part of the data displayed, the user double-taps in a first position 305 and, while holding the stylus 9c pressed after the second tap, moves the stylus 9c to a second position 306, where the stylus 9c is lifted. In other words, the user depresses the stylus 9c, lifts the stylus 9c, depresses the stylus 9c a second time, moves the stylus 9c and finally lifts the stylus 9c.

As is known in the art, a threshold time may be used for double-tapping such that a difference in time between the first pressing down and the second pressing down must be less than the threshold time for it to be considered a double-tap.

Also as known in the art, a displacement in position between the first depression and the second depression must be less than a specific threshold distance for it to be considered a double-tap. In summary, selection of data is performed with a double-tap and drag.

The above described method to select data is different from conventional methods to select data. The most common method to select data is to press the stylus 9c down, move the stylus 9c and lift the stylus 9c. However, as explained in conjunction with FIGS. 15A and 15B above, this method is used to pan through content.

Consequently, with the novel and inventive way to select data in the inventive aspect, text selection or panning may be performed at will by the user without requiring the user to switch to a specific text selection or panning mode.

It is also to be noted that it is also in scope of the inventive aspect to perform panning with a double-tap and drag, and data selection with a tap and drag.

Figure 17A:
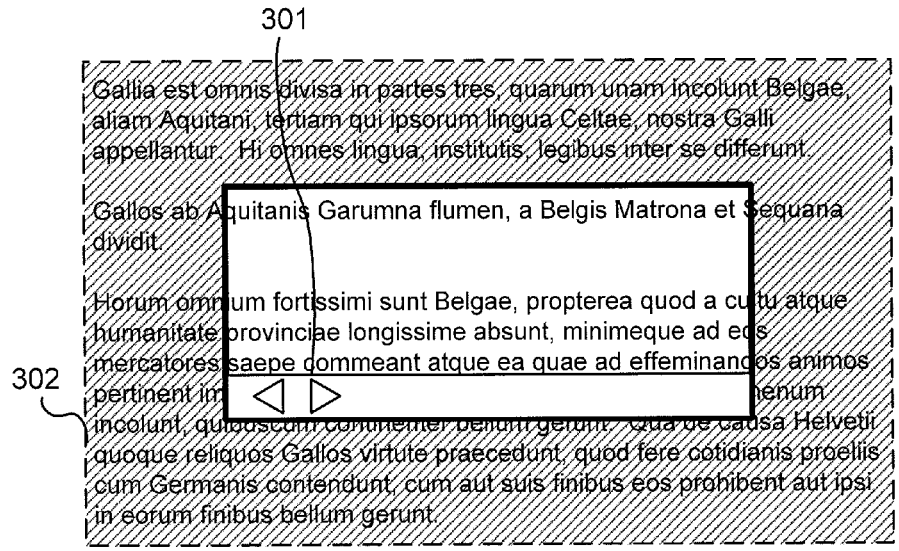
FIGS. 17A and 17B illustrate how a user may zoom in or out on text in an embodiment of an inventive aspect.
Figure 17B:
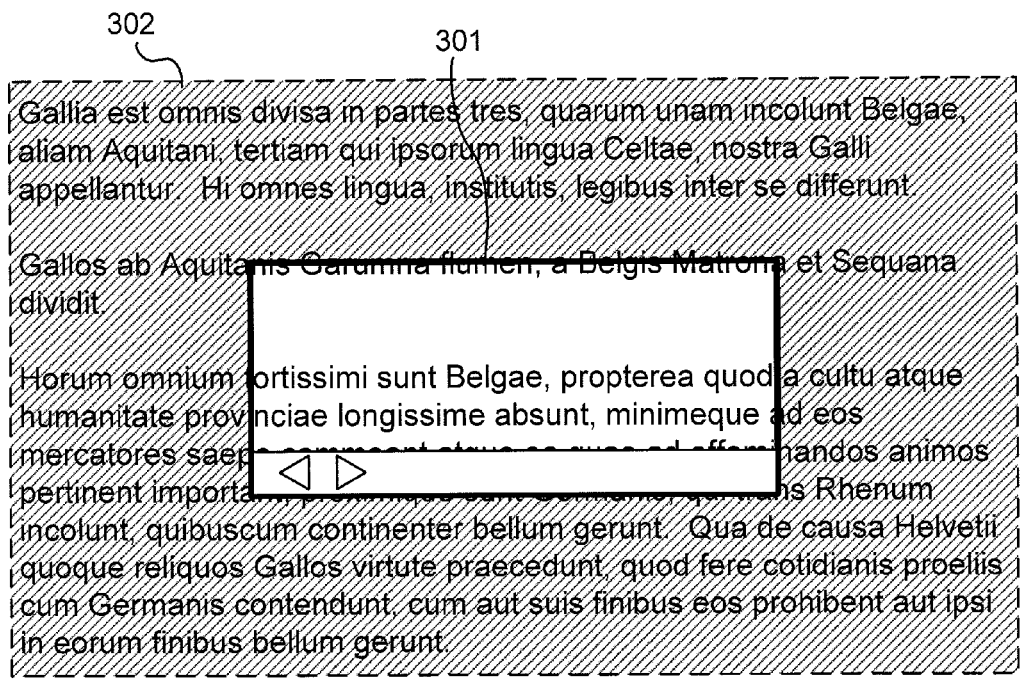

FIGS. 17A and 17B illustrate how the user may zoom in or out on text in an embodiment of an inventive aspect.

FIG. 17A displays an initial state where the display view 301 displays content being a subset of the available content 302. The user presses a zoom in button 4b, after which the display is updated to zoom in on the available content as is shown in FIG. 17B. Due to the enlargement of displayed data items, such as text, once zoomed in, the display displays less content than before.

Analogously, if the initial state is as shown in FIG. 16B and the user presses a zoom out button 4b, the display is updated to zoom out on the available content such as is shown in FIG. 17A. Consequently, more data items, such as text, will be displayed once the display is zoomed out.

The zooming functionality as explained above is particularly useful in conjunction with the panning functionality described in conjunction with FIG. 15 above. This combination provides an exceptionally efficient manner for the user to navigate through content being larger than the physical display, which for example often is the case while using a web browser application.

Figure 18:
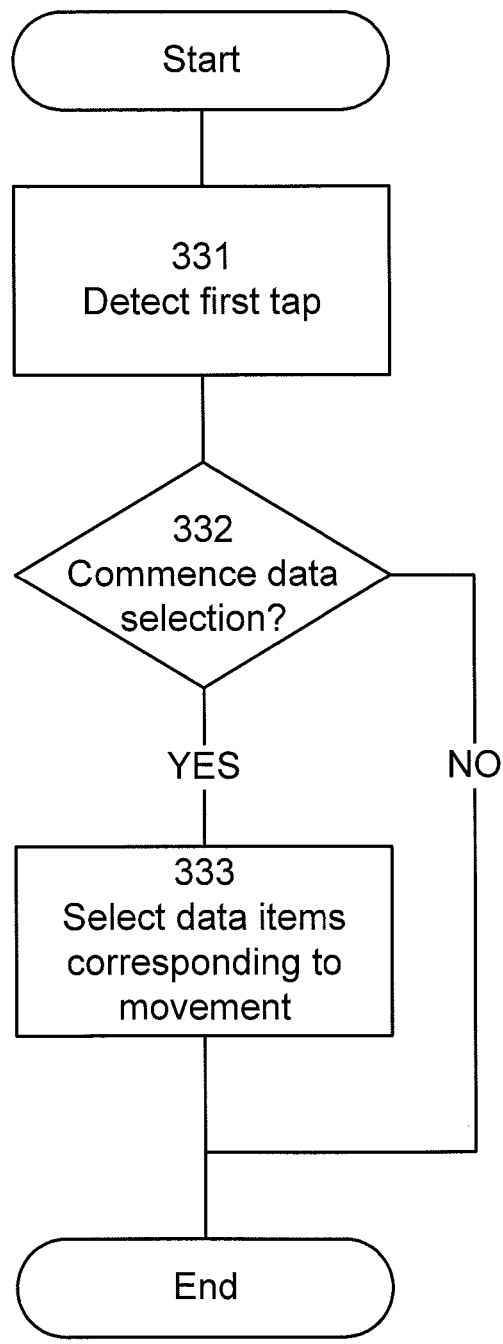
FIG. 18 is a flow chart illustrating a method for allowing data selection in an embodiment of an inventive aspect.

FIG. 18 is a flow chart illustrating a method for allowing data selection in an embodiment of an inventive aspect. The method in this embodiment is implemented as software code instructions executing in the pocket computer 1. In this method, the display view 301 shows a number of data items of available content 302, where the data items are for example text and/or images. However the display may show any data item representable on a display.

In a detect first tap step 331, the pocket computer 1 detects a tap by the stylus 9c on the touch sensitive display of the pocket computer 1.

In a conditional commence data selection step 332, it is determined whether data selection should be commenced. If a second tap of the stylus 9c is detected, which in conjunction with the tap in the detect first tap step 331 makes up a double tap, it is determined that data selection is to be commenced. However, the time difference between the first and the second tap must be less than a predetermined time. This predetermined time is preferably configurable by the user. Additionally, the second tap position must be in a position less than a threshold distance from said first position. This threshold relative distance, rather than requiring identical positions, is preferably used as it is rather likely that the second tap of an intended double tap by the user is in fact not in the exact same position as the first tap.

If it is determined to commence selection of data in the previous step, execution of the method proceeds to a select data items corresponding to movement step 333. Here any movement after the second tap, while the stylus 9c is still pressed, is detected, giving a current position of the stylus 9c. It can then be determined that all data items between the first tap position and the current position of the stylus 9c are selected by the user. This information is updated in the memory 54 in the pocket computer 1 for further processing and is also displayed on the display 3. Once the user lifts the stylus 9c from the display, the selection has been made and this method ends.

If it is not determined in the commence data selection step 332 that data selection is to be commenced, execution of the method ends.

With a selection of data items made, the user may, as is known in the art, perform various tasks associated with the selected data items. For example the user may copy the selected data items into a buffer and paste these data items into the same or another document. Alternatively, if the selected data items are text, the selected text could be formatted in various ways.

Figure 19:
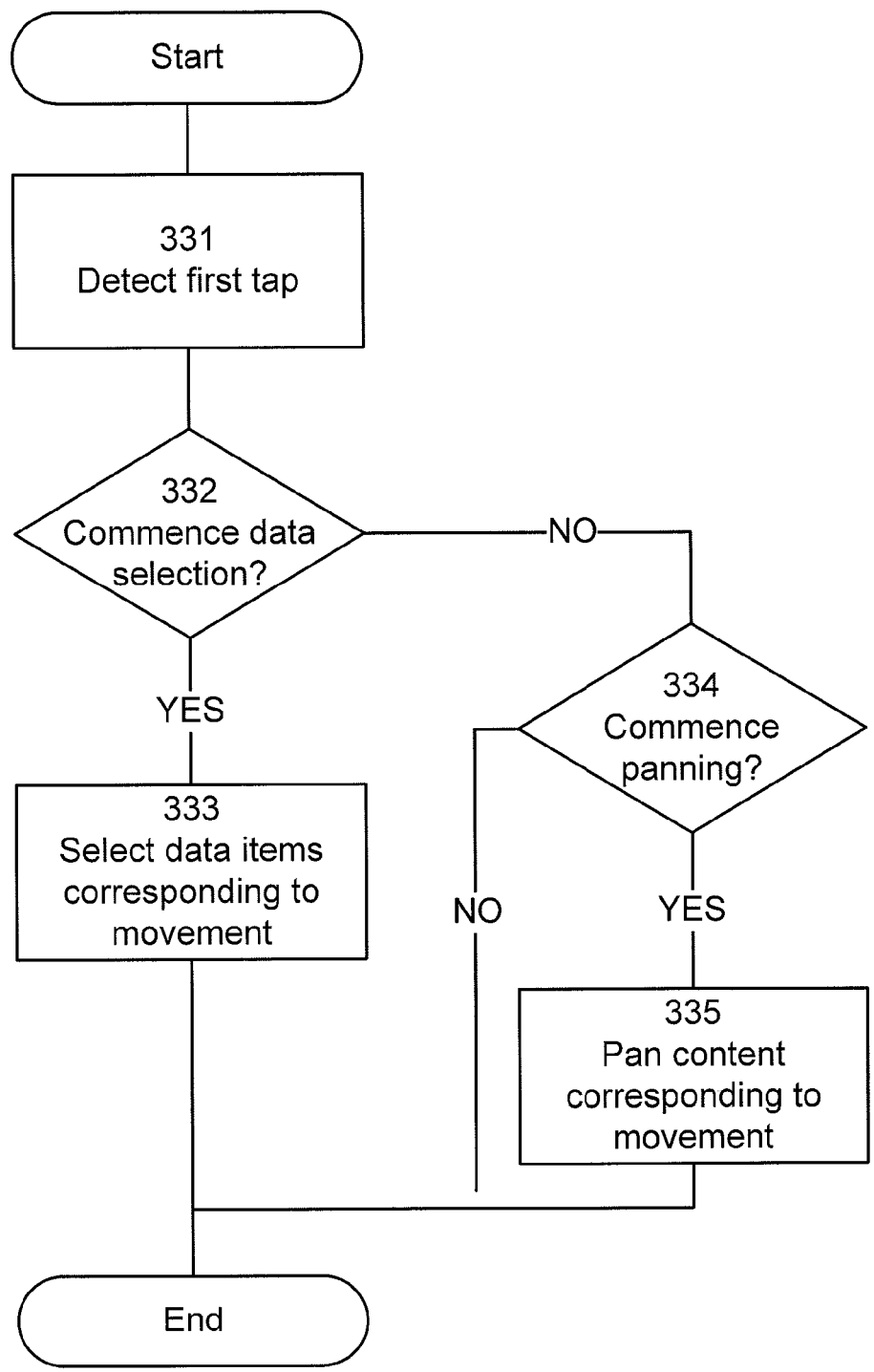
FIG. 19 is a flow chart illustrating a method for allowing both data selection and panning in an embodiment of an inventive aspect.

FIG. 19 is a flow chart illustrating a method for allowing both data selection and panning in an embodiment of an inventive aspect. The method in this embodiment is implemented as software code instructions executing in the pocket computer 1. In this method, the display view 301 shows a number of data items of available content 302, where the data items are for example text and/or images. This method is essentially an extension of the method shown in FIG. 18.

The detect first tap step 331, the commence data selection step 332 and the select data items corresponding to movement step 333 are in the present embodiment identical to the embodiment shown in FIG. 18.

However, in this embodiment, if in the commence data selection step 332 it is determined that data selection is not to be commenced, execution proceeds to a conditional commence panning step 334. In the commence panning step 334, it is determined whether panning is to be commenced. If it is detected that the stylus 9c used in the detect first tap step 331 is still being pressed and has moved in position from a first position detected in the detect first tap step 331, it is determined that panning is to be commenced. The movement relative to the first position may need to be more than a threshold distance to avoid unintentional panning.

If in the commence panning step 334 it is determined that panning is to be commenced, execution of the method proceeds to a pan content corresponding to movement step 335. While the stylus 9c is still pressed, in this step the content in the display is moved according to the movement of the stylus 9c. For example, if the stylus 9c is moved to the left, the underlying available content is moved to the left, such as can be seen in FIG. 15A and 15B, where FIG. 15A shows a display view 301 before the move of the stylus 9c to the left and FIG. 15B shows a display view 301 after the stylus 9c is moved to the left. This is the classical way to perform panning. However, as it may be preferred that the display, rather than the content, is moved in the same direction as the stylus 9c movement, in an alternative embodiment, the display view may move to the left if the stylus 9c is moved to the left. This alternative type of behavior is more often referred to scrolling, rather than panning. Once it is detected that the user has lifted the stylus 9c, panning ends and the execution of this method ends.

If it is not determined in the commence panning step 334 that panning is to be commenced, execution of the method ends.

Figure 20:
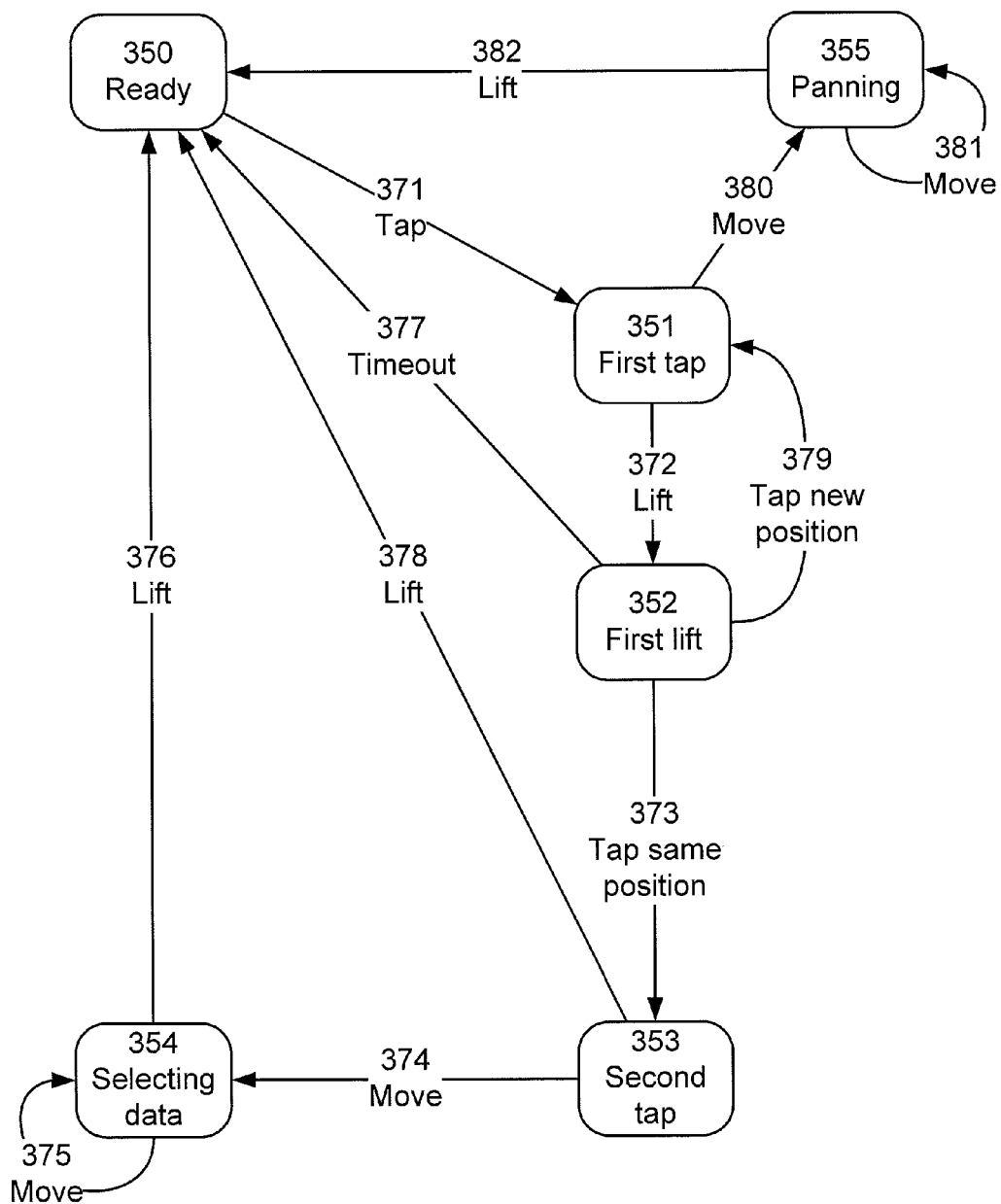
FIG. 20 is a state diagram for an embodiment of an inventive aspect, allowing both data selection and panning.

FIG. 20 is a state diagram for an embodiment of an inventive aspect, allowing both data selection and panning. This diagram illustrates the different states and transition actions between the states in an embodiment allowing the user to select data and to pan without expressively changing modes. This embodiment is implemented as software code instructions executing in the pocket computer 1.

A ready state 350 represents a mode when the pocket computer 1 is ready to accept input from the user to either start panning or start selecting text.

From the ready state 350, if the user performs a tap action 371 with the stylus 9c in a first position, the computer transitions to a first tap state 351.

From the first tap state 351, if the user performs a lift action 372 with the stylus 9c, the computer transitions to a first lift state 352. On the other hand, from the first tap state 351, if the user with the stylus 9c still pressed performs a move action 380 with the stylus 9c, the computer transitions to a panning state 355.

From the first lift state 352, if the user performs a tap new position action 379 with the stylus 9c, the computer returns to a first tap state 351. The new position may need to be more than a threshold distance from the first position, as the user may tap a second tap of a double tap not in the identical position as the original tap. If instead in the first lift state 352, a timeout action 377 is triggered by the computer, the computer returns to the ready state 350. If in the first lift state 352, the user instead performs a tap same position action 373 with the stylus 9c, the computer transitions to a second tap state 353.

From the second tap state 353, if the user performs a lift action 378 with the stylus 9c, the computer transitions to the ready state 350. On the other hand, from the second tap state 353, if the user with the stylus 9c still pressed performs a move action 374 with the stylus 9c, the computer transitions to a selecting data state 354.

Upon entering the selecting data state 354 the computer updates the display to indicate the data on the display between the first position and the current position as selected. The memory 54 is also updated to indicate what data items are currently selected. From the selecting data state 354, if the user performs a move action 375 with the stylus 9c, the computer reenters the selecting data state 354 with a new current position of the stylus 9c. On the other hand, from the selecting data state 354, if the user performs a lift action 376 with the stylus 9c, the computer transitions to the ready state 350, while retaining the current selected data items in the memory 54 for further processing. Also, any indication on the display of the selection is retained.

When the computer enters the panning state 355 after the user performs a move action 380 from the first tap state 351, the computer updates the display, moving the available content corresponding to the distance between the current position and the first position. From the panning state 355, if the user performs a move action 381 with the stylus 9c, the computer reenters the panning state 355 with a new current position. On the other hand, from the panning state 355, if the user performs a lift action 382 with the stylus 9c, the computer transitions to the ready state 350.

Figure 21:
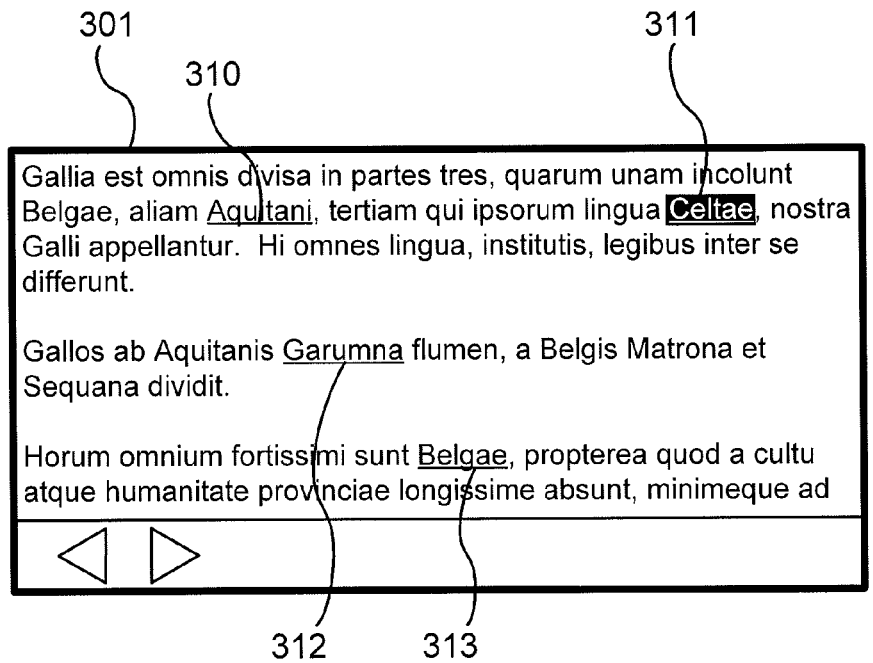
FIG. 21 illustrates a web browser showing content with hyperlinks.

FIG. 21 illustrates a web browser showing content with hyperlinks. In this example, the web browser application executing in the pocket computer 1 renders a text on a display view 301 including a number of hyperlinks 310-313. As is known in the art, if the user taps on one of the links using the stylus 9c on the touch sensitive display 3, the web browser application will in stead display a new web page, referred to by the hyperlink.

Alternatively, hardware buttons, such as a right button and a left button of navigation key 5a, may be used to browse through available hyperlinks 310-313, with at most one hyperlink being selected at any one time, such as hyperlink 311. In the prior art, a tab key on a computer keyboard is used to browse through the available hyperlinks. A web page author may add information about relative the order of the hyperlinks using what is called tab order. This tab order is usually determined by the web page author in order to maximize usability when the web page is displayed on a full size computer display. Thus, when the web page is displayed on a display of the pocket computer, where the pixel resolution is often significantly less than on a full size computer, the original tab order may not be optimal.

In an embodiment of an inventive aspect, the tab order indicated by the web author is ignored. Instead, the relative order of the hyperlinks is determined by the geometrical layout on the display. Again with reference to FIG. 21, there may be an example where hyperlink 310 has a tab order of 3, hyperlink 311 has a tab order of 2, hyperlink 312 has a tab order of 5 and hyperlink 313 has a tab order of 4. If the user now indicates a desire to navigate to the subsequent hyperlink after a currently selected hyperlink 311, in the prior art, hyperlink 310 would be determined to be the subsequent hyperlink after hyperlink 311 as hyperlink 310 has the tab order of 3, and the hyperlink 311 has the tab order of 2. However, in this embodiment of an inventive aspect, as the geometrical position takes precedence over the tab order of the hyperlinks, the subsequent hyperlink after hyperlink 311 would be determined as hyperlink 312.

This method works in two directions, so if hyperlink 311 is selected and the user indicates a desire to select the subsequent hyperlink before hyperlink 311, hyperlink 310 would be selected.

Figure 22A:
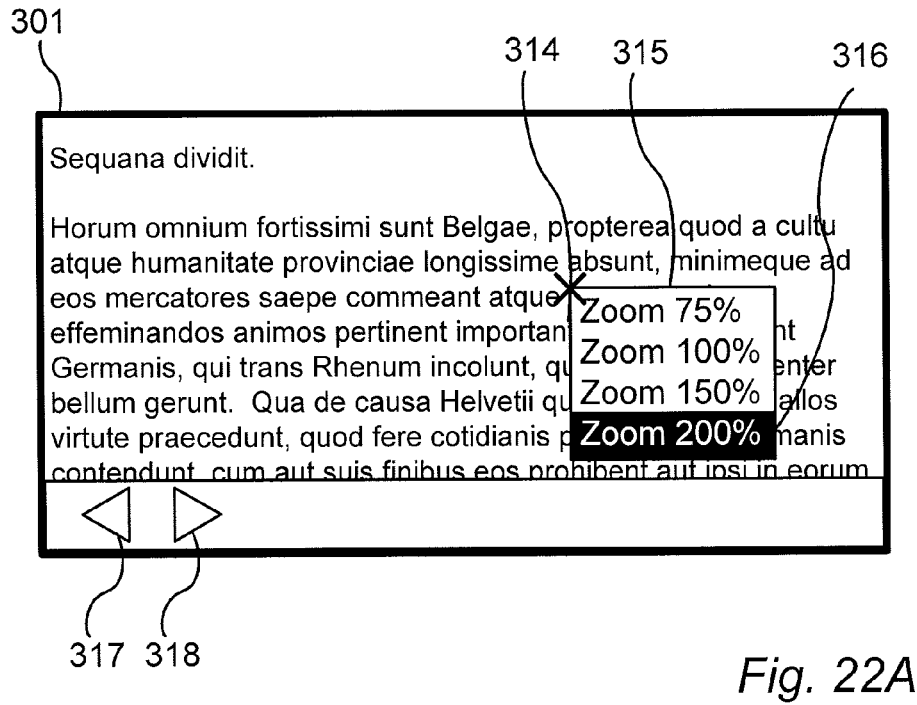
FIGS. 22A and 22B illustrate an embodiment of an inventive aspect before and after a positioned zoom.
Figure 22B:
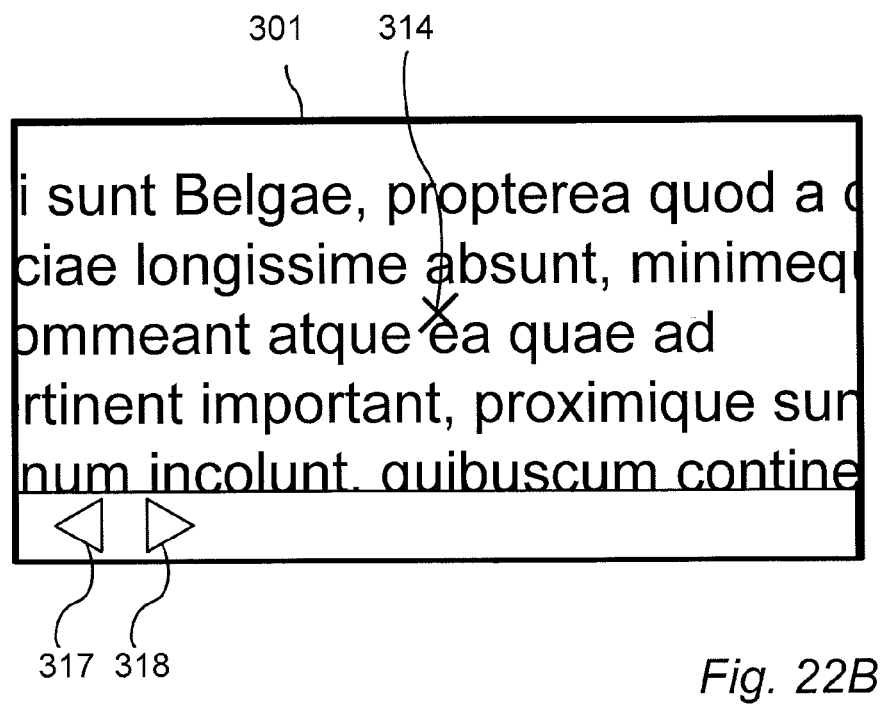

FIGS. 22A and 22B illustrate an embodiment of an inventive aspect before and after a positioned zoom.

In FIG. 22A, the display view 301 of the touch sensitive display 3 of the pocket computer 1 shows content with a zoom factor of 100%. In this example, the content is a web page rendered by a web browser application executing in the pocket computer 1. However, any application where the user may benefit from a zoom function could be executing. In this example, the user has held the stylus 9c on the touch sensitive display 3 in a position 314 during a time period longer than a predetermined time, which has the effect of a context menu 315 showing. In this example, the menu only shows different zoom factors, but any relevant menu items, such as navigation forward and backwards, properties, etc. may be presented in this menu. Additionally, while this example only shows menu items in one level, the menu items may be organized in a hierarchical manner to provide a structured menu, in the case where there are more menu items available which may be grouped in logical subgroups.

In this example, the user selects to zoom to 200% by selecting menu item 316.

After the user selects the zoom factor, the application proceeds to re-render the same content but now with the new zoom factor, in this case 200%, as can be seen in FIG. 22B. The position relative to the content 314 in FIG. 22A is now a center position in the content re-rendered by the web browser application.

FIG. 23 illustrate new content loaded in a web browser. FIGS. 22A and 22B can also be used in conjunction with FIG. 23 to illustrate an embodiment of an inventive aspect where zoom factor information is retained. An example of such a method will now be disclosed.

As shown in FIG. 22A, the user may navigate to a first page containing content displayed in the display view 301 with an initial zoom factor of 100%. The user may, for example, change the zoom factor to a new zoom factor of 200% for the first page, by using a context sensitive menu 315 as explained above. The web browser re-renders the content with the new zoom factor of 200% for the first page as can be seen in FIG. 22B.

The user may then navigate to a second page, using a link on the first page, by entering a uniform resource locator (URL), or by any other means. As shown in FIG. 23, the second page is then rendered with an initial zoom factor of 100%.

The user may then wish to return to the first page, for example using a back button 317 in the web browser application. Upon the user pressing the back button 317, the web browser then re-renders the first page, using the new zoom factor of 200% for the first page. In other words, the browser keeps zoom factor information in memory 54 as part of the browser history, benefiting the browsing experience for the user. This information is stored so it can be used when revisiting already visited pages, either using the back or a forward functionality by means of a back button 317 or a forward button 318, respectively, commonly provided by web browsers in the art.

Figure 24:
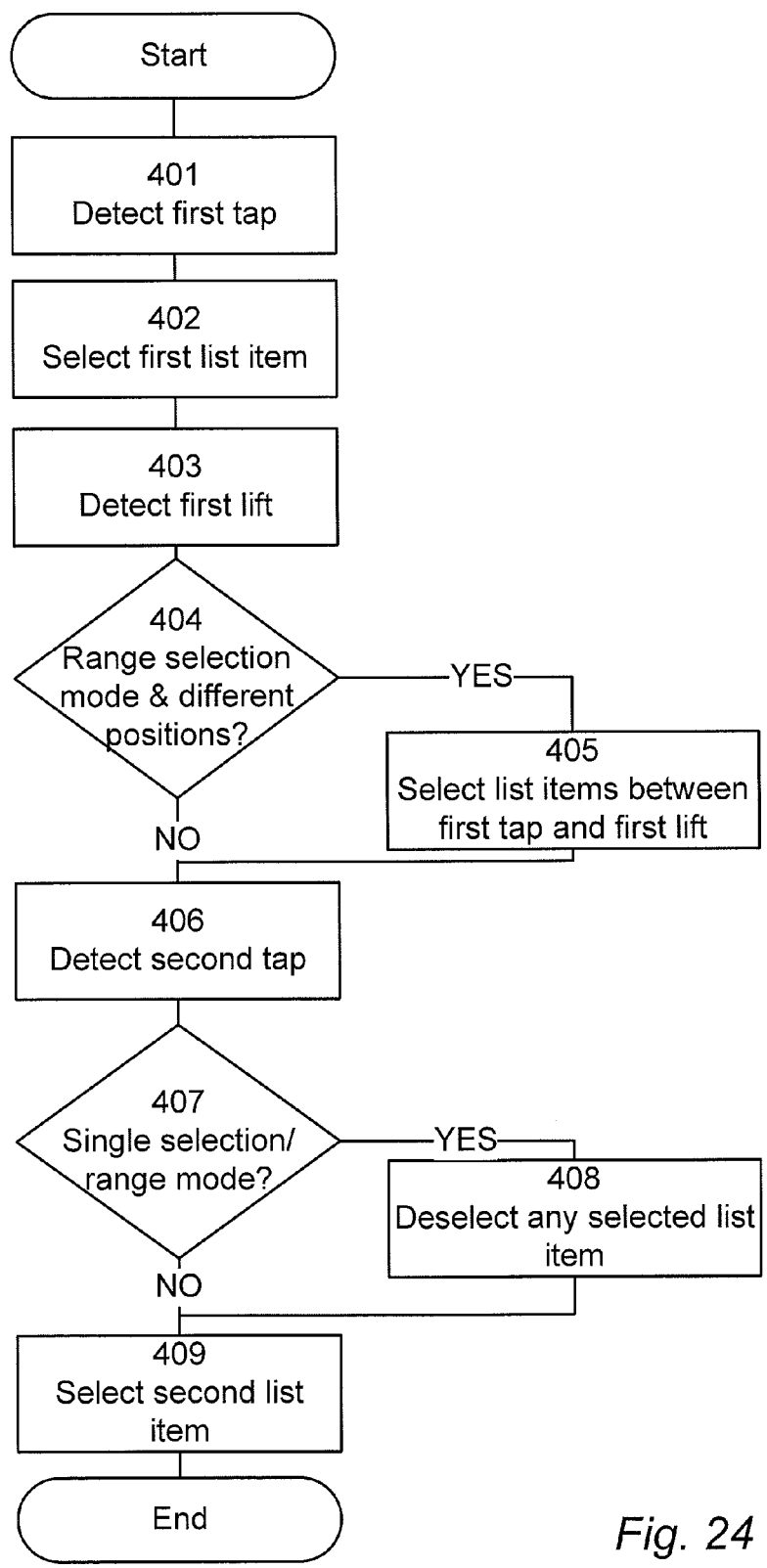
FIG. 24 is a flow chart illustrating a method of an embodiment of a list element according to an inventive aspect.
Figure 26A:
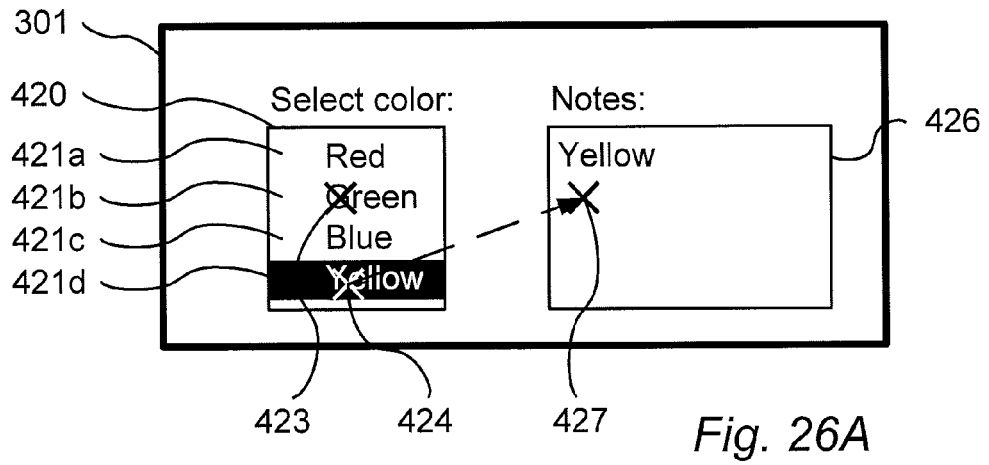
FIGS. 26A-C illustrate a list element in an embodiment of the in a context of other user interface elements.
Figure 26B:
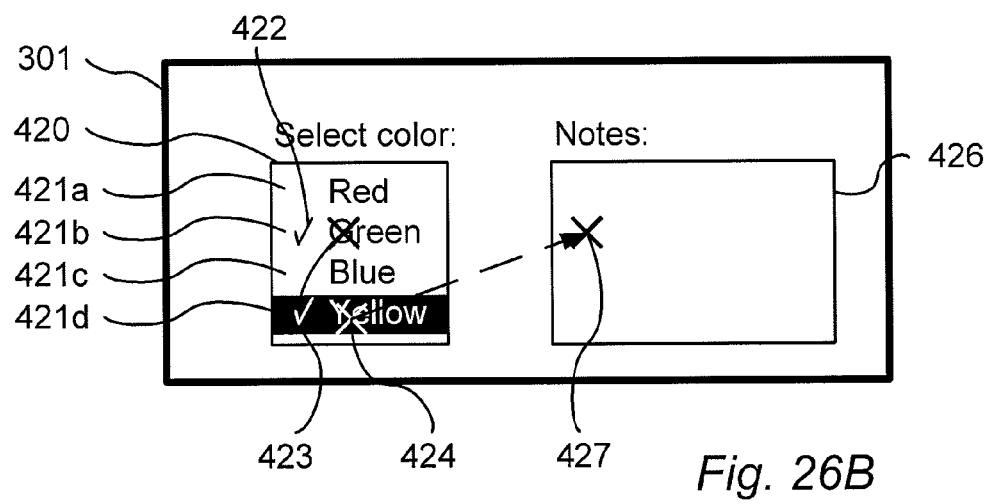
Figure 26C:
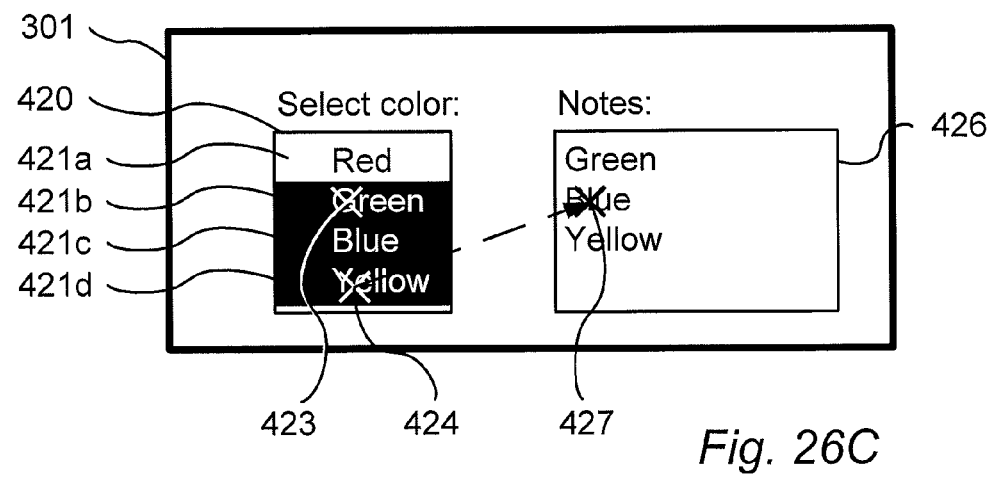

FIG. 24 is a flow chart illustrating a method of an embodiment of a list element according to an inventive aspect. Refer to FIG. 26A-C for an illustrative graphical representation of the list element. The method provides the user with a user interface element representing a list, henceforth called a list element 420, having several ways in which its list items 421a-d may be selected. In this example, the list element 420 is operable in three modes: a single selection mode, a multiple distinct selection mode and a range selection mode. The flow chart illustrates the way in which selections may be made in the different list element modes. The method in this example is executing in the pocket computer 1 with its touch sensitive display 3.

In a detect first tap step 401, a first tap is detected from the stylus 9c being tapped on the touch sensitive display in a first position.

In a select first list item step 402 a first list item corresponding to the first position is selected in the list element 420. The selection may for example be indicated on the display by changing the background color of the selected item and/or rendering a border around the selected item. Additionally, information about the selected item is stored in memory 54 to be available for later processing.

In a detect first lift step 403, a first lift of the stylus 9c is detected in a second position. This second position may be the same or different from the first position detected in the detect first tap step 401 above. In other words, the user may have moved the stylus 9c between the first tap and the first lift.

In a conditional range selection mode & different positions step 404, it is firstly determined if the list element 420 is configured to be in a range selection mode. Secondly, it is determined which first list item corresponds to the first position, when the tap was detected, and which second list item corresponds to the second position, when the lift was detected. If the first list item and the second list item are the same, and the list element 420 is determined to be in a range selection mode, this conditional step is affirmative and execution proceeds to a select list items between first tap and first lift step 405. Otherwise, execution proceeds to a detect second tap step 406.

In the select list items between first tap and first lift step 405, all items between the first list item and the second list item are selected. Preferably, the first and the second list items are also selected. What this entails for the user, is that upon dragging over several list items, all of these are selected, provided that the list element 420 is in range selection mode.

In the detect second tap step 406, a second tap is detected in a position on the touch sensitive display.

In a conditional single selection/range mode step 407, it is determined if the list element 420 is in a single selection or range mode. If this is affirmative, execution proceeds to a deselect any previously selected list items step 408. Otherwise execution proceeds to a select second list item step 409.

In the deselect any selected list item step 408, any previously selected list items are deselected.

In the select second list item step 409, a list item corresponding to the position detected in the detect second tap step 406 above is selected. Due to the effect of the deselect any selected list item step 408 above, multiple distinct selections are only possible if the list element 420 is in a multiple distinct selection mode.

Figure 25:
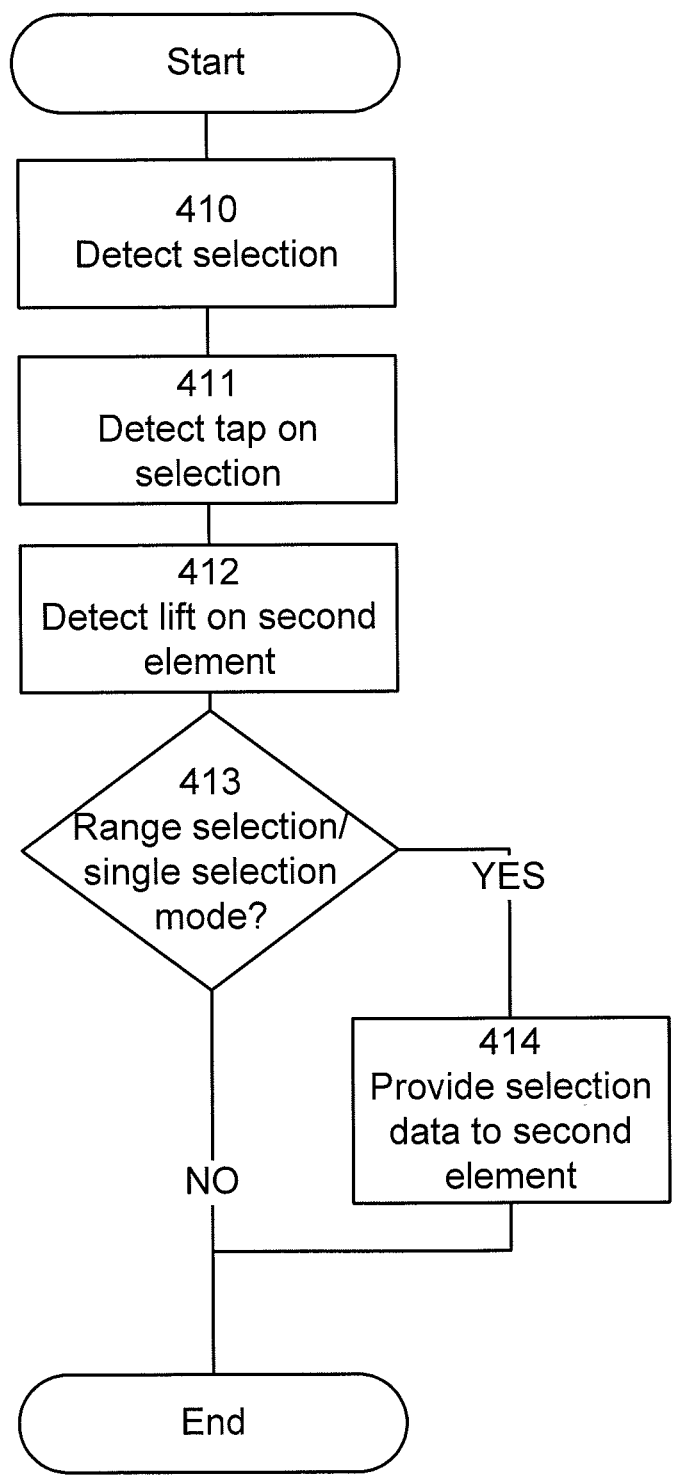
FIG. 25 is a flow chart illustrating drag and drop functionality in an embodiment of a list element according to an inventive aspect.

FIG. 25 is a flow chart illustrating drag and drop functionality in an embodiment of a list element according to an inventive aspect. The figure illustrates how a selection made in a list element 420 may be dragged and dropped to another user interface element.

In a detect selection step 410, a selection of one or more list elements 420 is detected. The details of how the selection may be made are disclosed in conjunction with FIG. 24 above.

In a detect tap on selection step 411 a tap is detected on the touch sensitive display. The position of this tap corresponds to a list item that is currently selected, as a result of the detect selection step 410 above.

In a detect a lift on second element step 412, a lift of the stylus 9c is detected in a position corresponding to a second user interface element. This corresponds to the behavior called drag and drop, which is well known per se in the art.

In a conditional range selection/single selection mode step 413, it is determined if the list element 420 is in a range selection or a single selection mode. If this is affirmative, execution proceeds to a provide selection data to second element step 414. Otherwise, execution of this method ends.

In the provide selection data to second element step 414, data corresponding to the list item or list items that are currently selected is provided to the second user interface element. If, for example, the second user interface element is a text area 426, the text data corresponding to the list item/items that are selected, may added to the text field.

FIGS. 26A-C illustrate the list element in an embodiment of the in the context of other user interface elements, where the list element 420 is in a single selection mode, multiple distinct selection mode and a range selection mode, respectively.

Firstly, FIG. 26A, where the list element 420 is in a single selection mode, will be explained. On the touch sensitive display 3 of the pocket computer 1, a number of user interface elements are shown on a display view 301.

The list element 420 has four list items 421a-d. A text area 426 is also displayed. Firstly, the user presses the stylus 9c in a position 423, corresponding to a specific list item 421b, activating a selection of the list element 421b. Secondly, the user presses the stylus 9c in a position 424, activating a selection of a second list item 421d. When the second list item 421d is selected, the first list item 421b is deselected. Finally, the user performs a drag and drop operation, by tapping the stylus 9c in a position corresponding to the second list item 421d and, while holding the stylus 9c pressed, moving the stylus 9c to a position 427 in the text area 426 and lifting the stylus 9c. As this is a single selection list element 420, drag and drop is possible, and information about the selected list item 421d in the list element 420 is provided to the text area 426, whereby the text corresponding to the selected list item 421d may be added to the text area 426. It is to be noted that the text area 426 may be of the same application of the list element 420 or a totally separate application 57.

Secondly, FIG. 26B, where the list element 420 is in a multiple distinct selection mode, will be explained. Firstly, the user presses the stylus 9c in a position 423, corresponding to a specific list item 421b, activating a selection of the list element 421b. In this type of list element 420, a selected list item is indicated with a check box 422 next to the list item. Secondly, the user presses the stylus 9c in a position 424, activating a selection of a second list item 421d. When the second list item 421d is selected, the first list item 421b is still selected. Finally, the user attempts to perform a drag and drop operation, by tapping the stylus 9c in a position corresponding to the second list item 421d and, while holding the stylus 9c pressed, moving the stylus 9c to a position 427 in the text area 426 and lifting the stylus 9c. As this is a multiple distinct selection list element 420, drag and drop is not possible, and no information may be provided to the text area 426. Instead, from the second tap in the position 424, the second list item 421d is deselected.

Thirdly, FIG. 26C, where the list element 420 is in a range selection mode, will be explained. The user presses the stylus 9c in a position 423, corresponding to a specific list item 421b, activating a selection of the list element 421b. While still keeping the stylus 9c pressed, the user then moves the stylus 9c to a position and lifts the stylus 9c. This dragging selects list items 421b to 421d. The user then performs a drag and drop operation, by tapping the stylus 9c in a position 424 corresponding to the second list item 421d and, while holding the stylus 9c pressed, moving the stylus 9c to a position 427 in the text area 426 and lifting the stylus 9c. As this is a range selection list element 420, drag and drop is possible, and information about the selected list item 421d in the list element 420 is provided to the text area 426, whereby the text corresponding to the selected list items 421b-d may be added to the text area 426.

Figure 27A:
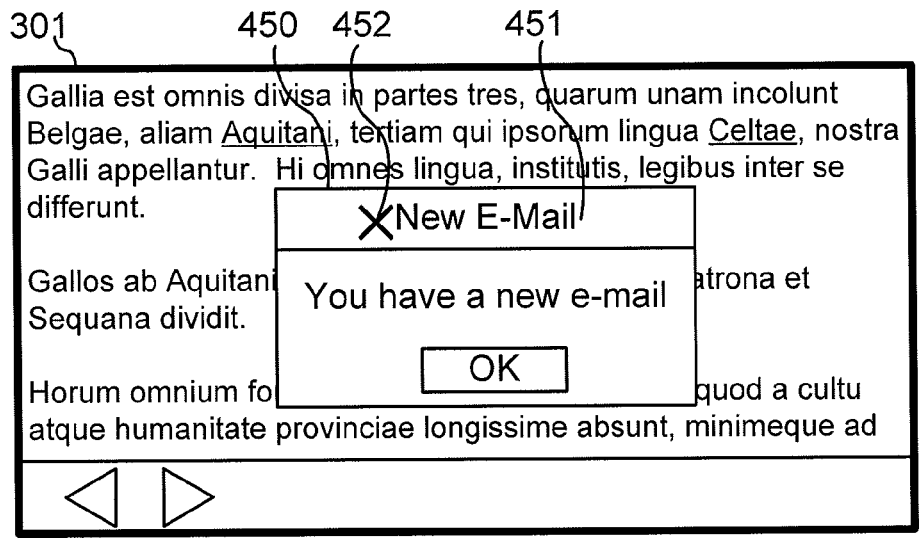
FIGS. 27A and 27B illustrate how a window hiding method works in an embodiment of an inventive aspect.
Figure 27B:
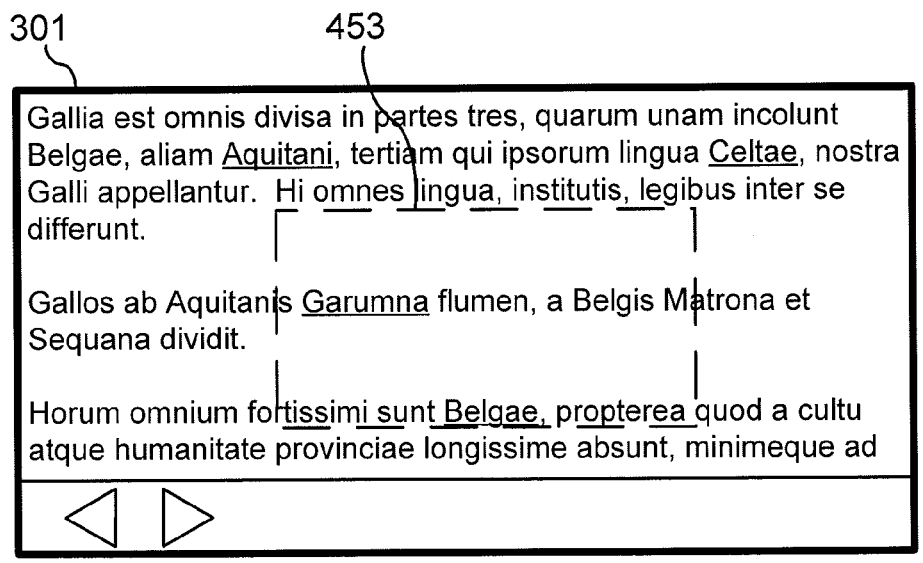

FIGS. 27A and 27B illustrate how a window hiding method works in an embodiment of an inventive aspect.

Beginning with FIG. 27A, on the pocket computer 1, there is the touch sensitive display 3, showing a display view 301. A window 450 is displayed on a layer in front of any other windows currently displayed. The window may be a full window, or a dialog, such as is shown here. The window comprises a head area 451. The user taps the stylus 9c in a position 452 on the touch sensitive display 3, corresponding to the head area 451 of the window 450.

As a result, the window 450 and its contents are hidden, as can be seen in FIG. 27B, thereby exposing any content previously covered by the window 450. Preferably, a box outline 453 is displayed, showing the location of the hidden window.

Once the user lifts the stylus 9c, the window 450 is displayed again, effecting a view 301 as seen in FIG. 27A.

Figure 28A:
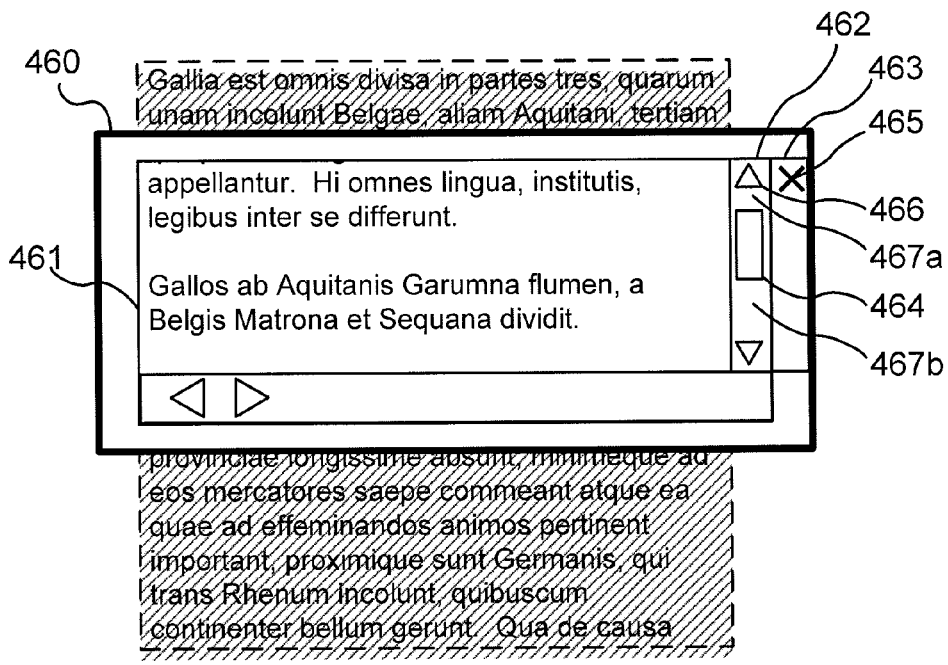
FIGS. 28A and 28B illustrate a remote scroll element in embodiments of an inventive aspect.

FIG. 28A is a diagram illustrating a remote scrolling element 463 in an embodiment of an inventive aspect. The pocket computer comprises the display 3 with a visible area 460. A web browser 461 currently uses all available space of the view 461 available to an application, leaving space for a remote scroll element 463. The web browser has a vertical scrollbar 462 comprising a scroll thumb 464. As the scrollbar 462 is vertical, the remote scroll element 463 is also vertical. If the scrollbar 462 would have been horizontal, the remote scroll element 463 would have been placed along the bottom of the display 460, assuming a predominately horizontal shape. If the user presses the stylus 9c in a position on the remote scroll element 463, the application responds in the same way as if the user would have pressed on the scrollbar 462 with a same vertical co-ordinate. For example, if the user presses in a position 465 on the remote scroll element 463, which has the same vertical co-ordinate as a up arrow 466 of the scrollbar 462, it has the same effect as if the user would have pressed on the up arrow 466 immediately, i.e. scrolling the screen upwards. All actions that can be performed on the scrollbar 463 itself, such as scrolling up and down using the arrow buttons, scrolling by dragging the scroll thumb 464, or pressing in the area below or above the scroll thumb to scroll a page at a time, can in this way be performed by a corresponding press on the remote scroll element 463.

Figure 28B:
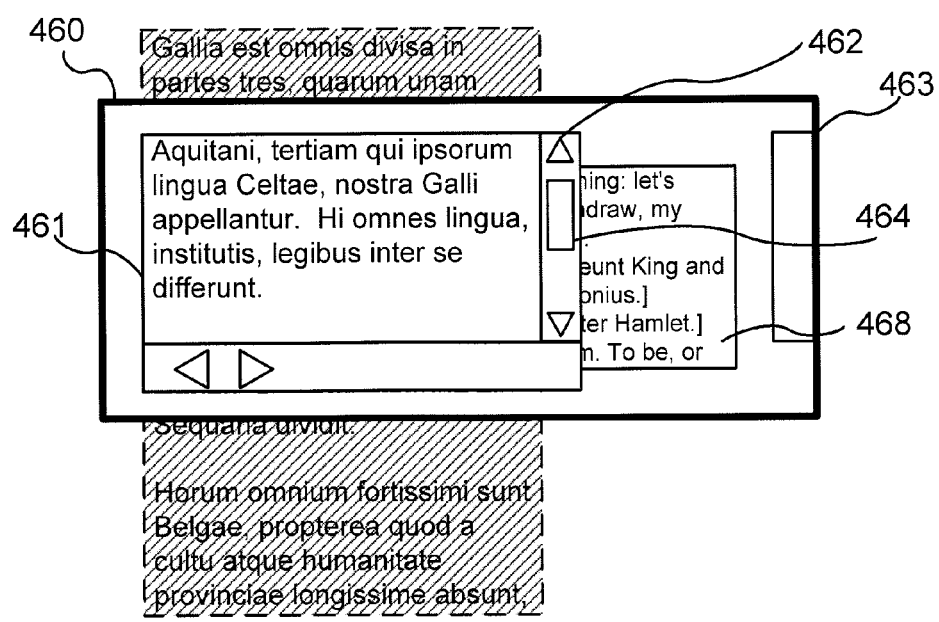

FIG. 28B is a diagram illustrating a disjunctive remote scrolling element 463 in an embodiment of an inventive aspect. The pocket computer 1 comprises the display 3 with a visible area 460. The web browser 461, comprising a scrollbar 462, is not occupying all available space of the view 461, and is only partly covering another application 468. The remote scroll element 463 is here located along the right side of the screen, not in direct contact with the web browser 461. Still, if the user presses the stylus 9c in a position on the remote scroll element 463, the application responds in the same way as if the user would have pressed on the scrollbar 462 with a same vertical co-ordinate. The remote scroll element 463 is located along the right side of the view 460 for convenience, and may be used for the currently active application, regardless of the position of the application on the view 460.

In one embodiment, the location of the remote scroll element 463 is visually indicated by e.g. including a bitmap image in the remote scroll element 463. In another embodiment, the remote scroll element 463 is partly or fully transparent, wherein the area on the display that underlies the remote scroll element 463 may be used for presentation of information such as non-selectable indicators (for instance a battery charge indicator or other status indicator).

FIG. 28A may also be used to explain another inventive aspect related to the scrollbar, wherein the scrollbar further comprises an upper part of a trough 467a and a lower part of the trough 467b. When the user presses the stylus 9c in the trough, for example in the lower part of the trough 467b, the content starts scrolling. The content continues to scroll, until either the end of the content is reached or the user lifts the stylus 9c. Thus, the content may continue to a position past the position where the user tapped the stylus. This makes the exact position of the stylus less important when scrolling, thereby significantly simplifying the scrolling procedure when the user is in a moving environment, such as a bus or train or while the user is walking.

The scrolling is made up of scrolling steps, where each step scrolls one page of content. Preferably there is a pause after the first step of scrolling, allowing the user to stop the scrolling after the first page of scrolling.

The inventive aspects have mainly been described above with reference to a number of embodiments. However, as is readily appreciated by a person skilled in the art, other embodiments than the ones disclosed above are equally possible within the scope of the inventive aspects, as defined by the appended patent claims.

The invention claimed is:

1. A method for scrolling content in a window displayed on a touch sensitive display of a pocket computer, comprising:
   enabling displaying of a scrollbar comprising a scroll thumb movable in a trough,
   enabling detecting of a stationary tap of a pointing tool in a stationary tapping position in said trough,
   enabling scrolling of said content during a period when said pointing tool is detected to be pressed down in the stationary tapping position, such that during said scrolling:
      the position of said scroll thumb is updated in said trough accordingly by moving said scroll thumb in said trough; and
      scrolling is allowed to continue, during the detected stationary tap, such that said position of said scroll thumb moves past said stationary tapping position in said trough, enabling detecting of a lift of said pointing tool, and
   once lift of said pointing tool is detected, enabling stopping said scrolling of content.

2. A method according to claim 1, wherein said step of scrolling said content scrolls content one page at a time.

3. A method according to claim 1, wherein said position is distinct from said scroll thumb.

4. A pocket computer adapted to perform the method according to claim 1.

5. The method of claim 1 wherein the pointing tool comprises one of a stylus, a pen and a user's finger.

6. An apparatus comprising;
   a controller; and
   a memory comprising one or more software code portions;
   the controller, with the memory and software code portions, being configured to:
   enable displaying of a scrollbar comprising a scroll thumb movable in a trough,
   enable detecting of a stationary tap of a pointing tool in a stationary tapping position in said trough,
   enable scrolling of said content during a period when said pointing tool is detected to be pressed down in the tapping position, such that during said scrolling:
      the position of said scroll thumb is updated in said trough accordingly by moving said scroll thumb in said trough; and
      scrolling is allowed to continue, during the detected stationary tap, such that said position of said scroll thumb moves past said stationary tapping position in said trough, enable detecting of a lift of said pointing tool, and
   once lift of said pointing tool is detected, enable stopping of said scrolling of content.

7. A computer program product comprising software code portions stored on a non-transitory medium, the software code portions being configured to, when loaded onto a computer:
   enable displaying of a scrollbar comprising a scroll thumb movable in a trough,
   enable detecting of a stationary tap of a pointing tool in a stationary tapping position in said trough,
   enable scrolling of said content during a period when said pointing tool is detected to be pressed down in the tapping position, such that during said scrolling:
      the position of said scroll thumb is updated in said trough accordingly by moving said scroll thumb in said trough; and
      scrolling is allowed to continue, during the detected stationary tap, such that said position of said scroll thumb moves past said stationary tapping position in said trough, enable detecting of a lift of said pointing tool, and
      once lift of said pointing tool is detected, enable stopping of said scrolling of content.

8. An apparatus according to claim 6, wherein enabling scrolling of said content comprises scrolling said content one page at a time.

9. An apparatus according to claim 6, wherein said position is distinct from said scroll thumb.

10. An apparatus according to claim 6 wherein the pointing tool comprises one of a stylus, a pen and a user's finger.

11. A computer program product according to claim 7, wherein enabling scrolling of said content comprises scrolling said content one page at a time.

12. A computer program product according to claim 7, wherein said position is distinct from said scroll thumb.

13. A computer program product according to claim 7, wherein the pointing tool comprises one of a stylus, a pen and a user's finger.

* * * * *